United States Patent
Lee et al.

(10) Patent No.: US 10,056,204 B2
(45) Date of Patent: Aug. 21, 2018

(54) KEY BUTTON ASSEMBLY AND ELECTRONIC DEVICE HAVING THE SAME

(71) Applicant: Samsung Electronics Co., Ltd., Suwon-si (KR)

(72) Inventors: Min-Sung Lee, Suwon-si (KR); Sang-In Baek, Suwon-si (KR); Hee-Cheul Moon, Seongnam-si (KR); Na-Young Chu, Gumi-si (KR); Kwon-Ho Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 15 days.

(21) Appl. No.: 15/017,163

(22) Filed: Feb. 5, 2016

(65) Prior Publication Data

US 2016/0233037 A1   Aug. 11, 2016

Related U.S. Application Data

(60) Provisional application No. 62/113,108, filed on Feb. 6, 2015.

(30) Foreign Application Priority Data

Mar. 24, 2015   (KR) .................. 10-2015-0040805

(51) Int. Cl.
| | | |
|---|---|---|
| *H01H 13/705* | (2006.01) | |
| *H01H 13/88* | (2006.01) | |
| *H01H 1/58* | (2006.01) | |
| *H04M 1/23* | (2006.01) | |

(52) U.S. Cl.
CPC ........ *H01H 13/705* (2013.01); *H01H 1/5805* (2013.01); *H01H 13/88* (2013.01); *H04M 1/236* (2013.01); *H01H 2001/5816* (2013.01); *H01H 2207/004* (2013.01); *H01H 2221/03* (2013.01); *H01H 2221/044* (2013.01); *H01H 2223/012* (2013.01); *H01H 2231/022* (2013.01)

(58) Field of Classification Search
CPC .... H01H 13/705; H01H 1/5805; H01H 13/88; H01H 2001/5816; H04M 1/236
USPC ........................................... 200/5 A
See application file for complete search history.

(56) References Cited

U.S. PATENT DOCUMENTS

| 5,176,733 A | 1/1993 | Koss |
|---|---|---|
| 8,737,045 B2 | 5/2014 | Dai |
| 9,047,044 B2 | 6/2015 | Raff |

(Continued)

FOREIGN PATENT DOCUMENTS

| CN | 101727234 A | 6/2010 |
|---|---|---|
| CN | 102110887 A | 6/2011 |

(Continued)

OTHER PUBLICATIONS

Int'l Search Report for PCT/KR2016/000372 dated Apr. 27, 2016.

(Continued)

*Primary Examiner* — Edwin A. Leon
*Assistant Examiner* — Iman Malakooti
(74) *Attorney, Agent, or Firm* — McAndrews, Held & Malloy, Ltd.

(57) ABSTRACT

According to various embodiments, an electronic device comprises a key button that can be assembled to keep the key button in place in the housing of the electronic device and functional without having to completely assemble the housing of the electronic device.

12 Claims, 39 Drawing Sheets

(56) References Cited

U.S. PATENT DOCUMENTS

| | | |
|---|---|---|
| 9,454,179 B2 | 9/2016 | Shin et al. |
| 9,557,770 B2 | 1/2017 | Shin et al. |
| 9,578,149 B2 | 2/2017 | Moon et al. |
| 2003/0103510 A1 | 6/2003 | Svanberg |
| 2006/0089171 A1 | 4/2006 | Yoo |
| 2009/0040115 A1 | 2/2009 | Zhang et al. |
| 2009/0256759 A1 | 10/2009 | Hill et al. |
| 2010/0315769 A1 | 12/2010 | Mathew et al. |
| 2011/0228494 A1* | 9/2011 | Xiao ............... H01H 13/705 361/752 |
| 2011/0241949 A1 | 10/2011 | Nick et al. |
| 2011/0287812 A1 | 11/2011 | Joo |
| 2012/0013510 A1 | 1/2012 | Yagi et al. |
| 2012/0021701 A1 | 1/2012 | Wong et al. |
| 2012/0044123 A1 | 2/2012 | Rothkopf |
| 2012/0050962 A1* | 3/2012 | Hsiung ............... H04M 1/236 361/679.01 |
| 2012/0178503 A1 | 7/2012 | Merz et al. |
| 2013/0250504 A1 | 9/2013 | Choi |
| 2013/0303092 A1 | 11/2013 | Penafiel |
| 2013/0318766 A1 | 12/2013 | Kiple et al. |
| 2013/0323579 A1 | 12/2013 | Hwang et al. |
| 2014/0085836 A1 | 3/2014 | Mo et al. |
| 2014/0091983 A1 | 4/2014 | Nakano et al. |
| 2014/0099527 A1 | 4/2014 | Seong et al. |
| 2014/0111927 A1 | 4/2014 | Raff |
| 2014/0153211 A1 | 6/2014 | Malek et al. |
| 2014/0198436 A1 | 7/2014 | Lim et al. |
| 2014/0228080 A1 | 8/2014 | Choi et al. |
| 2014/0233170 A1 | 8/2014 | Hobson et al. |
| 2014/0234581 A1 | 8/2014 | Immerman |
| 2014/0267097 A1 | 9/2014 | Lee et al. |
| 2014/0307370 A1 | 10/2014 | Zadesky et al. |
| 2014/0323063 A1 | 10/2014 | Xu et al. |
| 2014/0335322 A1 | 11/2014 | Luo |
| 2014/0361671 A1 | 12/2014 | Degner et al. |
| 2014/0367237 A1* | 12/2014 | Taylor ............... H01H 15/02 200/5 A |
| 2014/0368228 A1 | 12/2014 | Kim |
| 2015/0007501 A1* | 1/2015 | Liang ............... H04M 1/18 49/463 |
| 2015/0070236 A1 | 3/2015 | Walters et al. |
| 2015/0070825 A1 | 3/2015 | Perko |
| 2015/0140291 A1 | 5/2015 | Kim |
| 2015/0155614 A1 | 6/2015 | Youn et al. |
| 2016/0182112 A1 | 6/2016 | Kim et al. |
| 2017/0041443 A1 | 2/2017 | Rostami |
| 2017/0060182 A1 | 3/2017 | Shin et al. |

FOREIGN PATENT DOCUMENTS

| | | |
|---|---|---|
| CN | 102684722 A | 9/2012 |
| CN | 103458641 | 12/2013 |
| CN | 103987223 | 8/2014 |
| EP | 2498336 A2 | 9/2012 |
| EP | 2533502 A1 | 12/2012 |
| EP | 2709283 A1 | 3/2014 |
| KR | 100716761 B1 | 7/2006 |
| KR | 100716761 B1 | 5/2007 |
| KR | 20080043998 A | 5/2008 |
| KR | 10-2010-0136719 A | 12/2010 |
| KR | 10-2011-0006039 A | 1/2011 |
| KR | 20110080630 A | 7/2011 |
| KR | 10-2011-0127483 A | 11/2011 |
| KR | 10-2013-0015535 A | 2/2013 |
| KR | 20130014784 A | 2/2013 |
| KR | 101279793 B1 | 6/2013 |
| KR | 10-2013-0099499 A | 9/2013 |
| KR | 10-2013-0127050 A | 11/2013 |
| KR | 20140101240 A | 8/2014 |
| WO | 2015001181 A1 | 1/2015 |

OTHER PUBLICATIONS

Int'l Search Report for PCT/KR2016/000383 dated Apr. 28, 2016.
Extended European Search Report for EP16150482.4 dated May 20, 2016.
Extended European Search Report for EP16151140.7 dated May 30, 2016.
Extended European Search Report for EP16150921.1 dated Jun. 3, 2016.
Thomas Halleck: "Samsung Will Release Galaxy S6 With Two Curved Edges, a Glass Back and Non-Removable Battery, Reports Say", Jan. 20, 2015 (Jan. 20, 2015), XP055271607, Retrieved from the Internet: URL:http://www.ibtimes.com/samsung-will-release-galaxy-s6-two-curvededges-glass-back-non-removable-battery-1788104 [retrieved on May 10, 2016].
Michael Maier: "MWC: Samsung teasert Galaxy S6 Edge an I TechStage", Feb. 3, 2015 (Feb. 3, 2015), XP055271738, Retrieved from the Internet: URL:http://www.techstage.de/news/MWC-Samsung-teasert-Galaxy-S6-Edge-an-2535441. html [retrieved on May 11, 2016].
Mark Prigg: "Samsung's Galaxy S6 will have curved screens that cover its sides I Daily Mail Online", Jan. 21, 2015 (Jan. 21, 2015), XP055271817, Retrieved from the Internet: URL:http://www.dailymail.co.uk/sciencetech/article-2918936/Samsung-sGalaxy-S6-curved-screens-cover -sides-special-editio n-handset-setApple-s-i Phone-6. Html [retrieved on May 11, 2016].
Notice of Allowance dated Oct. 13, 2016 corresponding to U.S. Appl. No. 14/994,546.
Non-Final Office Action dated Aug. 30, 2017, U.S. Appl. No. 15/402,695.
Seng, Hands on Xiaomi Mi Note, Jan. 2015 http://www.hardwarezone.com.sg/feature-hands-xiaomi-mi-note.
YouTube, Motorola Moto X (2nd Gen), 2014 https://www.youtube.com/watch?v=v8XJyOa4IG8.
Non-Final Office Action dated Jun. 29, 2017, U.S. Appl. No. 14/996,149.
Non-Final Office Action dated Sep. 7, 2017 corresponding to U.S. Appl. No. 14/997,126.
Office Action dated Nov. 6, 2017 corresponding to Chinese Application No. CN201610023927.6.
Chinese Office Action, Appln. No. 201610023927.6 dated Nov. 6, 2017.
Non-Final Office Action, U.S. Appl. No. 14/997,126 dated Sep. 7, 2017.
Thomas Halleck, "Samsung Will Release Galaxy S6 With Two Curved Edges, A Glass Back and Non-Removable Battery, Reports Say", http://www.ibtimes.com/samsung-will-release-galaxy-s6-two-curved-edges-glass-back-non-removable-battery-1788104, published Jan. 20, 2015.
Michael Maier, "MWC: Samsung teasert Galaxy S6 Edge an, TechStage", http://www.techstage.de/news/mwc-samsung-teasert-Galaxy-S6-Edge-an-2535441.html, published Feb. 3, 2015.
Extended European Search Rreport dated Mar. 6, 2018 corresponding to European Patent Application No. 17209860.0.
Final Office Action dated Jan. 17, 2018 corresponding to U.S. Appl. No. 14/996,149.
Final Office Action dated Apr. 18, 2018 corresponding to U.S. Appl. No. 15/402,695.
Australian Office Action dated Jun. 7, 2018 Application No. 2016216322.
Chinese Office Action dated May 23, 2018 Application No. 201610023927.6.
Chinese Office Action dated May 25, 2018 Application No. 201610028066.0.
Samsung to Release New 4.99 Inch Touch Screen Phone, http://tekarticles.com/article/samsung-to-release-new-4-99-inch-touch-screen-phone-906/, TekArticles, May 25, 2018.

* cited by examiner

KEY BUTTON ASSEMBLY AND ELECTRONIC DEVICE HAVING THE SAME

RELATED APPLICATION(S)

This application claims the priority under 35 U.S.C. § 119(a) to U.S. Provisional Patent Application Ser. No. 62/113,108, which was filed in the USPTO on Feb. 6, 2015 and Korean Application Serial No. 10-2015-0040805, which was filed in the Korean Intellectual Property Office on Mar. 24, 2015, the entire contents of which are hereby incorporated by reference.

BACKGROUND

Various embodiments of the present disclosure relate to an electronic device, and more particularly, to a key button assembly that works in the electronic device without assembling the entire electronic device.

With the advancement of electronic communication technologies, electronic devices having various functions have appeared. Such electronic devices generally have a convergence function that is able to perform one or more functions. As the functional differences between electronic devices of various manufacturers have recently been greatly reduced, the manufacturers are making the electronic devices thin while still attempting to keep them rigid to keep them from flexing. As a part of the effort, various structures (e.g., exteriors) of the electronic devices are at least partially implemented using metallic material so as to provide luxurious and elegant looking exteriors for the electronic devices.

In addition, terminal manufacturers are also making an effort to deliver intuitive and diverse information to users through the slim electronic devices, and as a part of the effort, the terminal manufacturers are releasing displays of various shapes. In some of these electronic devices one or more key buttons are provided to switch functions by physical pressing them, and endeavors are being made to improve the key button for ease of assembly and performance test.

SUMMARY

In general, the electronic device may include at least one physical key button that is disposed to be at least partially exposed to the outside. According to one embodiment, the key button may be configured as a volume button that is disposed on one side of the electronic device and performs a volume up/down function. According to one embodiment, the key button may also be disposed on the other side of the electronic device and may perform a power ON/OFF function, a wake-up/sleep function, or the like.

A method of assembling a conventional key button may include a method of assembling the key button in the outside of a set and a method of assembling the key button in the inside of a set.

The method of assembling the key button on the outside of a set is a method in which a flexible printed circuit board (FPCB) is attached to a main instrument (e.g., the housing of the electronic device) and the key button is fitted from the outside. This method is advantageous since the key button and the FPCB can be assembled together and tested for things such as tactile feedback and the life span of the key button prior to assembling the key button with the electronic device. However, there is a disadvantage in that scratches may occur on the exterior when the button of the key button is assembled. In addition, when the key button is assembled outside of the electronic device, the key button may separate more easily from the electronic device since the device coupling the key button to the electronic device is small.

The method of assembling the key button in the inside of a set may include assembling the key button to the main instrument (e.g., the housing of the electronic device) first, then assembling the FPCB to the other instrument (e.g., the bracket), and then assembling the two instruments with each other. In such a case, the key button and the FPCB are assembled to different instruments (e.g., the housing and the bracket). Accordingly, there is a disadvantage in that in order to test the performances of the key button, it is necessary to assemble housing and the bracket, and when a defect is detected, it is necessary to dissemble the set again.

The present disclosure has been made in order to alleviate the problems described above, and according to various embodiments of the present disclosure, a key button assembly and an electronic device including the same may be provided.

According to various embodiments, a key button assembly may be implemented in an electronic device to enable key button performance testing without the need to complete the assembly of the electronic device.

According to various embodiments, it is possible to provide an electronic device, which may be portable, that includes: a front glass cover that forms a front surface of the electronic device; a rear cover that forms a rear surface of the electronic device; a bezel that surrounds a space formed by the front cover and the rear cover, and includes a first portion that includes an opening; a display device that is embedded in the space, and includes a screen area that is exposed through the front cover; and a plate that includes a planar surface that is parallel with the front cover within the space, and includes a first protrusion and a second protrusion that are disposed close to the opening and are spaced apart from each other.

The first protrusion and the second protrusion are disposed to provide a passage that leads to the opening.

The electronic device further includes: a key that has a size and a shape that enable the key to pass through the passage and the opening, and is inserted into the passage and the opening to be movable in a first direction; a first member (elongated member) that is attached to or integrally formed with a surface of the key opposite to the surface of the key, which is exposed to the outside of the electronic device, so as to prevent the key from being pulled out to the outside; and a second member including, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the second protrusion.

The first member is inserted into a gap between the key and the central portion.

According to various embodiments, the first protrusion and the second protrusion may not be in contact with the first portion.

According to various embodiments, at least one of the first end portion and the second end portion may have a U-shape.

According to various embodiments, the electronic device may further include an electric component that is inserted into a gap between the first member and the central portion and senses the movement of the key, and at least one wire that extends from the component.

According to various embodiments, the plate may be integrally formed with the bezel.

According to various embodiments, the rear cover and the side surface portion may be integrally formed with each other.

According to various embodiments, the rear cover and the side surface portion may include the same material.

According to various embodiments, the material may be a metal.

According to various embodiments, it is possible to provide an electronic device, which may be portable, that includes: a front glass cover that forms a front surface of the electronic device; a rear cover that forms a rear surface of the electronic device; a bezel that surrounds a space formed by the front cover and the rear cover, and includes a first portion that includes a first opening and a second opening; a display device that is embedded in the space, and includes a screen area that is exposed through the front cover; and a plate that includes a planar surface that is parallel with the front cover within the space, and includes a first protrusion, a second protrusion, and a third protrusion, which are disposed close to the opening and are spaced apart from each other. The second protrusion is interposed between the first protrusion and the third protrusion.

The first protrusion and the second protrusion are disposed to provide a first passage that leads to the first opening without being in contact with the first portion.

The second protrusion and the third protrusion are disposed to provide a second passage that leads to the second opening without being in contact with the first portion.

The electronic device further includes: a first key that has a size and a shape that enable the first key to pass through the first passage and the first opening, and is inserted into the first passage and the first opening to be movable in a first direction; a second key that has a size and a shape which enable the second key to pass through the second passage and the second opening, and is inserted into the second passage and the second opening to be movable in the first direction; a first key member (elongated member) that is attached to or integrally formed with a surface of the first key opposite to the surface of the first key, which is exposed to the outside of the electronic device, so as to prevent the first key from being pulled out to the outside; a second key member (elongated member) that is attached to or integrally formed with a surface of the second key opposite to the surface of the second key, which is exposed to the outside of the electronic device, so as to prevent the second key from being pulled out to the outside; and a second member that includes, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the third protrusion.

The first key member is inserted into a gap between the first key and the central portion, and the second key member is inserted into a gap between the second key and the central portion.

According to various embodiments, it is possible to provide a method of manufacturing an electronic device, which may be portable, that includes: A) an operation of providing a bezel that surrounds an inner mounting space of the electronic device and a plate that is connected with the bezel, in which the bezel includes a first portion that includes an opening formed through a portion of the bezel, the plate that includes a planar surface that is parallel with the front cover within the space, and includes a first protrusion and a second protrusion that are disposed close to the opening and are spaced apart from each other, the first protrusion and the second protrusion being configured to form a passage that leads to the opening without being in contact with the first portion; B) an operation of inserting a key through the passage and the opening such that at least a part of the key is exposed to the outside of the electronic device; C) an operation of preventing the key from being pulled out to the outside by using a first member (elongated member) that is attached to or integrally formed with a surface of the key opposite to the surface of the key, which is exposed to the outside of the electronic device, and includes one end portion that extends in a first direction parallel to the longitudinal direction of the first portion, and the other end portion that extends in the first direction and is formed at the opposite side to the one end portion so as to prevent the key from being pulled out to the outside; and D) an operation of inserting a second member including, within the space, a central portion that extends in the first direction, a first end portion that extends in the first direction and is disposed between the first portion and the first protrusion, and a second end portion that extends in the first direction and is disposed between the first portion and the second protrusion.

According to various embodiments, the method may further include an operation of providing a rear cover that forms the rear surface of the electronic device.

According to various embodiments, the method may further include an operation of providing a front glass cover that forms the front surface of the electronic device.

According to various embodiments of the present disclosure, it is possible to provide an electronic device, which may be portable, that includes: a front glass cover that forms a front surface of the electronic device; a rear cover that forms a rear surface of the electronic device; a bezel that surrounds a space formed by the front cover and the rear cover, and includes a first portion that includes an opening; a display device that is embedded in the space, and includes a screen area that is exposed through the front cover; and a plate that includes a planar surface that is parallel with the front cover within the space, and includes a first protrusion and a second protrusion that are disposed close to the opening and are spaced apart from each other.

The first protrusion and the second protrusion are disposed to provide a passage that leads to the opening.

The electronic device further includes: a key that has a size and a shape that enable the key to pass through the passage and the opening, and is inserted into the passage and the opening to be movable in a first direction; a first member (elongated member) that is attached to or integrally formed with a surface of the key opposite to the surface of the key, which is exposed to the outside of the electronic device, so as to prevent the key from being pulled out to the outside; and a second member including, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the second protrusion.

The first member is inserted into a gap between the key and the central portion.

According to various embodiments, it is possible to provide an electronic device, which may be portable, that includes: a front glass cover that forms a front surface of the electronic device; a rear cover that forms a rear surface of the electronic device; a bezel that surrounds a space formed by the front cover and the rear cover, and includes a first portion that includes a first opening and a second opening; a display device that is embedded in the space, and includes a screen area that is exposed through the front cover; and a plate that includes a planar surface that is parallel with the front cover within the space, and includes a first protrusion, a second protrusion, and a third protrusion, which are disposed close to the opening and are spaced apart from each other. The second protrusion is interposed between the first protrusion and the third protrusion.

The first protrusion and the second protrusion are disposed to provide a first passage that leads to the first opening without being in contact with the first portion.

The second protrusion and the third protrusion are disposed to provide a second passage that leads to the second opening without being in contact with the first portion.

The electronic device further includes: a first key that has a size and a shape that enable the first key to pass through the first passage and the first opening, and is inserted into the first passage and the first opening to be movable in a first direction; a second key that has a size and a shape which enable the second key to pass through the second passage and the second opening, and is inserted into the second passage and the second opening to be movable in the first direction; a first key member (elongated member) that is attached to or integrally formed with a surface of the first key opposite to the surface of the first key, which is exposed to the outside of the electronic device, so as to prevent the first key from being pulled out to the outside; a second key member (elongated member) that is attached to or integrally formed with a surface of the second key opposite to the surface of the second key, which is exposed to the outside of the electronic device, so as to prevent the second key from being pulled out to the outside; and a second member that includes, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the third protrusion.

The first key member is inserted into a gap between the first key and the central portion, and the second key member is inserted into a gap between the second key and the central portion.

According to various embodiments, it is possible to provide a method of manufacturing an electronic device that includes: A) an operation of providing a bezel that surrounds an inner mounting space of the electronic device and a plate that is connected with the bezel, in which the bezel includes a first portion that includes an opening formed through a portion of the bezel, the plate that includes a planar surface that is parallel with the front cover within the space, and includes a first protrusion and a second protrusion that are disposed close to the opening and are spaced apart from each other, the first protrusion and the second protrusion being configured to form a passage that leads to the opening without being in contact with the first portion; B) an operation of inserting a key through the passage and the opening such that at least a part of the key is exposed to the outside of the electronic device; C) an operation of preventing the key from being pulled out to the outside by using a first member (elongated member) that is attached to or integrally formed with a surface of the key opposite to the surface of the key, which is exposed to the outside of the electronic device, and includes one end portion that extends in a first direction parallel to the longitudinal direction of the first portion, and the other end portion that extends in the first direction and is formed at the opposite side to the one end portion so as to prevent the key from being pulled out to the outside; and D) an operation of inserting a second member including, within the space, a central portion that extends in the first direction, a first end portion that extends in the first direction and is disposed between the first portion and the first protrusion, and a second end portion that extends in the first direction and is disposed between the first portion and the second protrusion.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
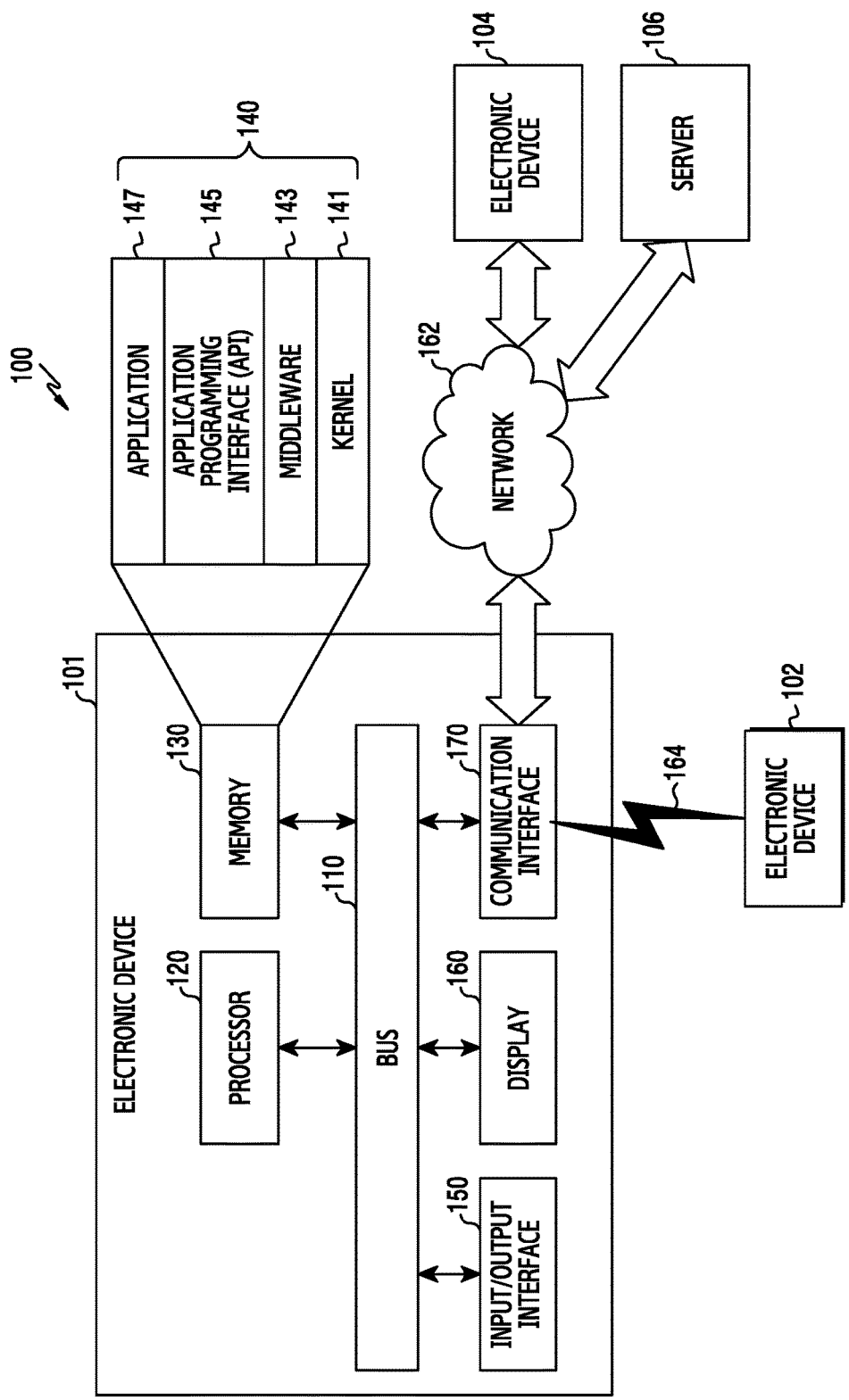
FIG. 1 is a view illustrating a network environment that includes an electronic device according to various embodiments of the present disclosure.

Various embodiments of the present disclosure will be described with reference to the accompanying drawings. However, it should be understood that there is no intent to limit the present disclosure to the particular forms disclosed herein. Rather, the present disclosure should be construed to cover various modifications, equivalents, and/or alternatives of embodiments of the present disclosure. In describing the drawings, similar reference numerals may be used to designate similar elements.

As used herein, the expression "have," "may have," "include," or "may include" refers to the existence of a corresponding feature (e.g., numeral, function, operation, or constituent element such as component) and does not exclude one or more additional features. As used herein, singular forms may include plural forms unless the context clearly indicates otherwise.

In the present disclosure, the expression "A or B," "at least one of A and/or B," or "one or more of A and/or B" may include all possible combinations of the items listed. For example, the expression "A or B," "at least one of A and B," or "at least one of A or B" refers to all of (1) including at least one A, (2) including at least one B, or (3) including at least one A and at least one B.

The expression "a first," "a second," "the first," or "the second" used in describing various embodiments of the present disclosure may modify various components regardless of the order and/or the importance but does not limit the corresponding components. The above expressions are used merely for the purpose of distinguishing an element from other elements. For example, a first user device and a second user device indicate different user devices although both of them are user devices. Accordingly, a "first user device" may be referred to as "a second user device," and similarly, "a second user device" may be referred to as "a first user device" without departing from the scope of the present disclosure.

In this disclosure "coupled" and "connected" may be used interchangeably. Furthermore, when a first element is referred to as being coupled (or operatively coupled or communicatively coupled) to a second element, it may be coupled with other element(s) between them. In contrast, when a first element is referred to as being "directly coupled" to a second element, there is no other element between them.

The expression "configured to" used in the present disclosure may be exchanged with, for example, "suitable for," "having the capacity to," "designed to," "adapted to," "made to," or "capable of" according to the situation. The term "configured to" may not necessarily imply "specifically designed to" in hardware. Alternatively, in some situations, the expression "device configured to" may mean that the device, together with other devices or components, "is able to." For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms used in the present disclosure are only used to describe specific embodiments and are not intended to limit the present disclosure. Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have meanings equal to the contextual meanings in the relevant field of the art unless clearly defined in the present disclosure. However, it should be noted that a term defined in the present disclosure should not be interpreted to exclude embodiments of the present disclosure unless specifically stated so.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), an MPEG-1 audio layer-3 (MP3) player, a mobile medical device, a camera, and a wearable device (e.g., a watch, a ring, a bracelet, an anklet, a necklace, glasses, a contact lens, or a Head-Mounted Device (HMD)), a fabric or clothing integrated type (e.g., electronic clothing), a body-mounted type (e.g., a skin pad, or tattoo), and a bio-implantable type (e.g., an implantable circuit).

According to various embodiments of the present disclosure, an electronic device may be a smart home appliance. The home appliance may include at least one of, for example, a television (TV), a Digital Video Disk (DVD) player, an audio unit, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV~), a game console (e.g., Xbox™ and PlayStation™) an electronic dictionary, an electronic key, a camcorder, and an electronic photo frame.

According to various embodiments of the present disclosure, the electronic device may include, for example, a blood glucose monitoring device, a heart rate monitoring device, a blood pressure measuring device, a body temperature measuring device, a Magnetic Resonance Angiography (MRA) device, a Magnetic Resonance Imaging (MRI) device, a Computed Tomography (CT) device, an ultrasonic device, a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, an electronic device may include at least one of a part of furniture or a building/structure, an electronic board, an electronic signature receiving device, a projector, and various kinds of measuring instruments such as, for example, a water meter, an electric meter, a gas meter, and a radio wave meter. An electronic device according to various embodiments of the present disclosure may be a combination of one or more of the aforementioned various devices. An electronic device according to some embodiments of the present disclosure may be a flexible device. Furthermore, an electronic device according to an embodiment of the present disclosure is not limited to the aforementioned devices, but may be a new electronic device developed with advancement of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Referring to FIG. 1, descriptions will be made of an electronic device 101 in a network environment 100 according to various embodiments. The electronic device 101 may include a bus 110, a processor 120, a memory 130, an input/output interface 150, a display 160, and a communication interface 170. According to various embodiments of the present disclosure, at least one of the components of the electronic device 101 may be omitted, or other components may be additionally included in the electronic device 101.

The bus 110 may include, for example, a circuit for transferring communication such as, for example, commands, control messages, instructions, and/or data between two of more of the processor 120, the memory 130, the input/output interface 150, the display 160, and the communication interface 170.

The processor 120 may include one or more of a Central Processing Unit (CPU), an Application Processor (AP), and a Communication Processor (CP). For example, the processor 120 may carry out operations or data processing related to control and/or communication of the electronic device 101.

The memory 130 may include a volatile memory and/or a non-volatile memory. The memory 130 may store, for example, programs, commands or data received from or generated by or received from the processor 120, the input/output interface 150, the display 160, and the communication interface 170. According to various embodiments of the disclosure, the memory 130 may store software 140. The software 140 may collectively refer to software, firmware, programs, etc. The software 140 may include, for example, a kernel 141, middleware 143, an Application Programming Interface (API) 145, and/or application programs 147. At least some of the kernel 141, the middleware 143, and the API 145 may be referred to as an Operating System (OS).

The kernel 141 may control or manage system resources such as, for example, the bus 110, the processor 120, the memory 130, the input/output interface 150, the display 160, and the communication interface 170 used for executing an operation or function implemented by the other programs (e.g., the middleware 143, the API 145, or the application program 147). The kernel 141 may provide an interface through which the middleware 143, the API 145, or the application program 147 may access individual components of the electronic device 101 to control or manage system resources.

The middleware 143 may serve to allow the API 145 or the application programs 147 to communicate with the kernel 141 to exchange data. Furthermore, the middleware 143 may control, for example, scheduling or load-balancing in response to requests for an operation received from the application program 147. Accordingly, the middleware 143 may be configures to allocate use of system resources such as, for example, the bus 110, the processor 120, the memory 130, the input/output interface 150, the display 160, and the communication interface 170 of the electronic device 101 with respect to at least one application of the application program 147.

The API 145 is an interface by which the applications 147 control functions provided from the kernel 141 or the middleware 143, and may include, for example, at least one interface or function (e.g., instructions) for file control, window control, image processing, or text control.

The input/output interface 150 may serve as an interface that may transfer instructions or data input by a user or from an external device such as, for example, the first electronic device 102, the second electronic device 104, or the server 106, to the electronic device 101. Further, the input/output interface 150 may output instructions or data from the electronic device 101 to a user or another external device such as, for example, the first electronic device 102, the second electronic device 104, or the server 106, to the electronic device 101.

The display 160 may include, for example, a Liquid Crystal Display (LCD), a Light Emitting Diode (LED) display, an Organic Light Emitting Diode (OLED) display, a MicroElectroMechanical System (MEMS) display, or an electronic paper display. The display 160 may display various types of contents (e.g., text, images, videos, icons, or symbols) to users. The display 160 may include a touch screen and receive, for example, a touch input, a gesture input, a proximity input, or a hovering input using an electronic pen or a user's body part.

The communication interface 170 may be used for communication between the electronic device 101 and one or more external devices such as, for example, the first electronic device 102, a second electronic device 104, and a server 106. For example, the communication interface 170 may be connected to a network 162 through wireless or wired communication to communicate with external devices such as, for example, the second electronic device 104 or the server 106.

The wireless communication may use standards such as, for example, at least one of Long Term Evolution (LTE), Long Term Evolution—Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM). The wired communication may include, for example, at least one of a Universal Serial Bus (USB), a High Definition Multimedia Interface (HDMI), RS-232, and a Plain Old Telephone Service (POTS). The network 162 may include at least one of communication networks such as a computer network (e.g., a local area network (LAN) or a wide area network (WAN)), the Internet, and a telephone network.

Each of the first electronic device 102 and the second electronic device 104 may be, for example, a device similar to the electronic device 101. According to an embodiment of the present disclosure, the server 106 may include a group of one or more servers. According to various embodiments, all or some of the operations performed by the electronic device 101 may be performed by another electronic device or a plurality of electronic devices such as, for example, the first electronic device 102, the second electronic device 104, or the server 106. According to various embodiments of the present disclosure, when the electronic device 101 has to perform any function or service automatically or in response to a request, the electronic device 101 may request that at least one external electronic device such as, for example, the first electronic device 102, the second electronic device 104, or the server 106 perform at least some functions related to the requested function or service. The external electronic device such as, for example, the first electronic device 102, the second electronic device 104, or the server 106 may carry out the requested function or service and transfer the result to the electronic device 101. The electronic device 101 may provide the requested functions or services based on the received result as is or after additionally processing the received result. To achieve this, for example, cloud computing, distributed computing, or client-server computing technology may be used.

Various embodiments of the present disclosure will be described with reference to a display that includes a bent or curved surface, and is attached to a housing of an electronic device. The housing may be formed of a non-metal member and a metal member (e.g., a metal bezel) through dual injection molding, but are not limited thereto. For example, the display may be applied to a housing, in which a metal member and/or a non-metal member are formed of a single material.

Figure 2A:
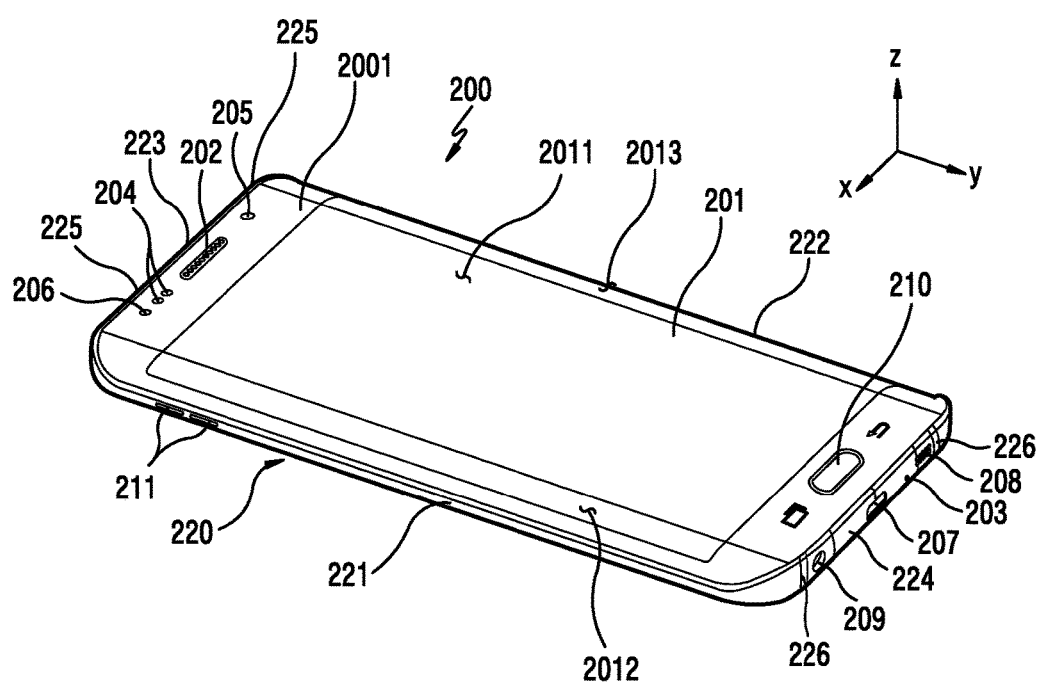
FIG. 2A is a front perspective view of an electronic device according to various embodiments of the present disclosure.
Figure 2B:
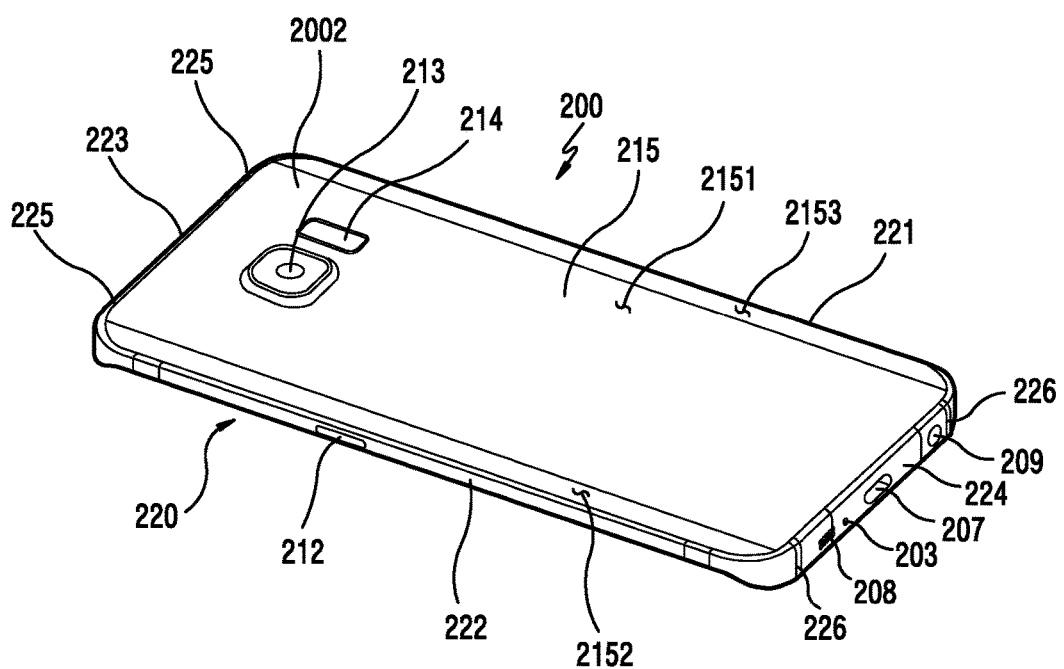
FIG. 2B is a rear perspective view of the electronic device according to various embodiments of the present disclosure.
Figure 2C:
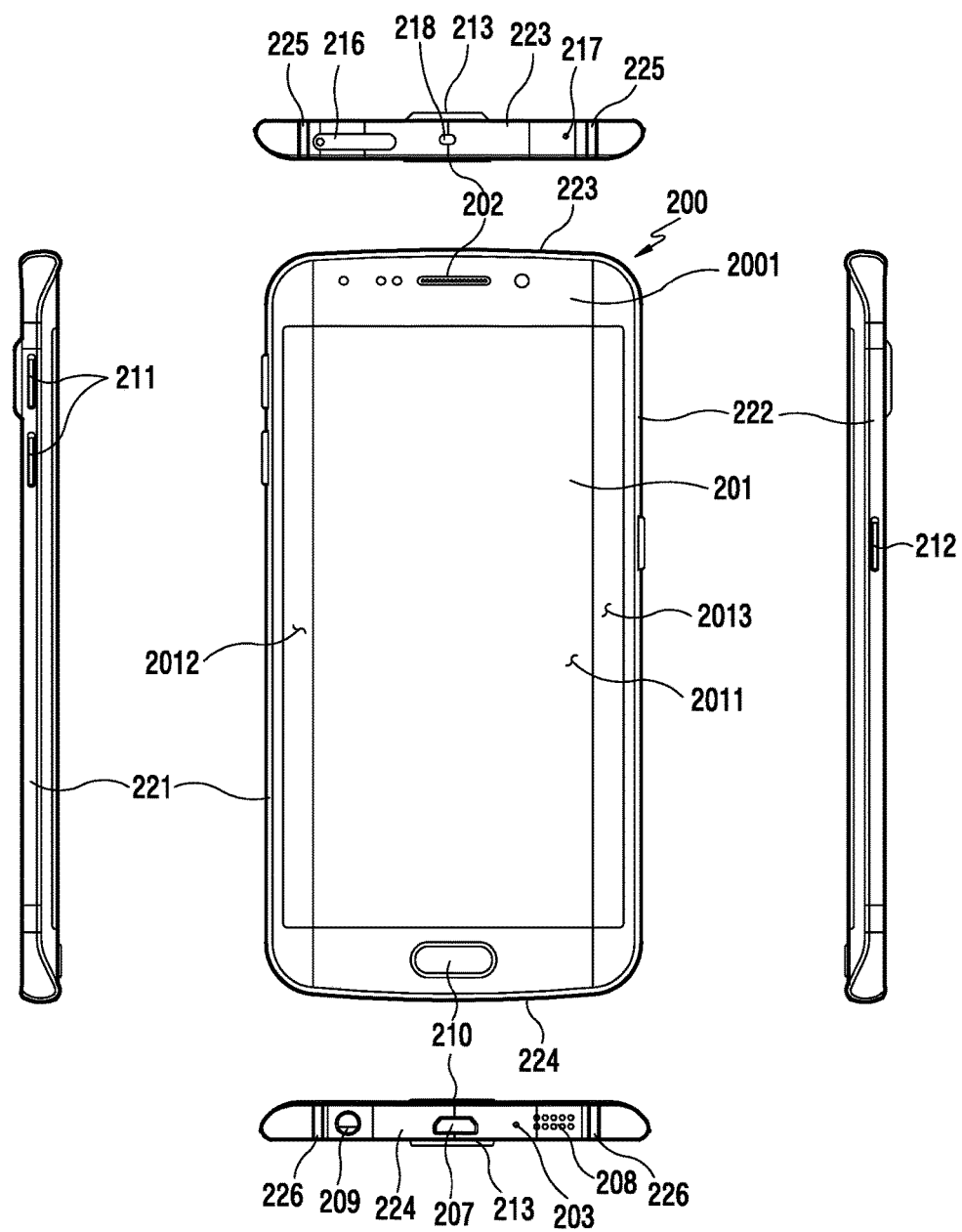
FIG. 2C illustrates views of the electronic device from various directions according to various embodiments of the present disclosure.

FIG. 2A is a front perspective view of an electronic device 200 according to various embodiments of the present disclosure. FIG. 2B is a rear perspective view of the electronic device 200 according to various embodiments of the present disclosure. FIG. 2C illustrates views of the electronic device 200 from various directions according to various embodiments of the present disclosure.

Referring to FIGS. 2A to 2C, a display 201 may be installed on a front surface 2001 of the electronic device 200. A speaker 202 for outputting sound may be disposed at the upper side of the display 201. A microphone device 203 for transmitting voice of a user of the electronic device 200 to the counterpart may be disposed at the lower end of the electronic device 200.

According to one embodiment, components for performing various functions of the electronic device 200 may be disposed around the speaker 202. The components may include a sensor module 204. The sensor module 204 may include at least one of, for example, an illuminance sensor (e.g., an optical sensor), a proximity sensor (e.g., an optical sensor), an infrared sensor, and an ultrasonic sensor. The components may also include a front camera device 205 and an indicator 206 to inform the user of state information of the electronic device 200.

The electronic device 200 may include a metal bezel 220 as a metal housing where the metal bezel 220 may be disposed along the outer periphery of the electronic device 200. The metal bezel 220 may be disposed to extend to at least a part of the rear surface of the electronic device 200, which is continuous to the outer periphery. The metal bezel 220 defines at least a part of the thickness of the electronic device 200 along the outer periphery of the electronic device 200, and may be formed in a closed loop shape. Without being limited thereto, however, the metal bezel 220 may be formed in a manner that contributes to at least a part of the thickness of the electronic device 200. According to one embodiment, the metal bezel 220 may only be disposed in a part of the outer periphery of the electronic device 200.

The metal bezel 220 may contribute to a part of the housing of the electronic device 200, and the remaining part of the housing may be non-metal material. In such a case, the housing may be formed by insert-molding the non-metal member to the metal bezel 220. According to one embodiment, the metal bezel 220 may include one or more cut-off portions 225 and 226 so that a unit bezel portion separated by the cut-off portions 225 and 226 may be utilized as an antenna radiator. An upper bezel portion 223 may be configured as a unit bezel portion by one pair of cut-off portions 225 that are formed at a predetermined interval, and a lower bezel portion 224 may be configured as a unit bezel portion by one pair of cut-off portions 226 that are formed at a predetermined interval. According to one embodiment, the cut-off portions 225 and 226 may be formed together when the non-metal member is insert-molded to the metal member.

The metal bezel 220 may have a closed loop shape along the outer periphery and may contribute to the thickness of the electronic device 200. When the electronic device 200 is viewed from the front side, the metal bezel 220 may include a left bezel portion 221, a right bezel portion 222, an upper bezel portion 223, and a lower bezel portion 224. According to various embodiments, various electronic components may be disposed on the lower bezel portion 224 of the electronic device 200. A speaker device 208 may be disposed on one side of the microphone device 203. At the other side of the microphone device 203, an interface connector port 207 may be disposed to perform a data transmission/reception function with respect to an external device and to charge the electronic device 200 by receiving an external power applied thereto. An audio jack socket 209 may be disposed on one side of the interface connector port 207. According to one embodiment, the microphone device 203, the speaker device 208, the interface connector port 207, and the audio jack socket 209 may be within the area of the unit bezel portion that is formed by one pair of cut-off portions 226 in the lower bezel portion 224. Without being limited thereto, however, at least one of the above-described electronic components may be disposed in the area that includes the cut-off portion 226, or may be disposed outside the unit bezel portion.

According to various embodiments, various electronic components may also be disposed on the upper bezel portion 223 of the electronic device 200. For example, a socket device 216 for insertion of a card-type external device may be disposed on the upper bezel portion 223. The socket device 216 may accommodate at least one of an inherent ID card for the electronic device (e.g., a subscriber identity module (SIM) card or a user identity module (UIM)), and a memory card for increasing the amount of memory. An infrared sensor module 218 may be on one side of the socket device 216, and an auxiliary microphone device 217 may be on the other side of the infrared sensor module 218. According to one embodiment, the socket device 216, the infrared sensor module 218, and the auxiliary microphone device 217 may be disposed within the area of the unit bezel portion formed by one pair of cut-off portions 225 that are disposed in the upper bezel portion 223. Without being limited thereto, however, at least one of the above-mentioned electronic components may be disposed in the area that includes of the cut-off portion 225, or may disposed outside the cut-off portion.

One or more first side key buttons 211 may be disposed on the left bezel portion 221 of the metal bezel 220. According to one embodiment, one pair of first side key buttons 211 may be disposed on the left bezel portion 221 for volume up/down function, scroll function, or the like. One or more second side key buttons 212 may be disposed on the right bezel portion 222 of the metal bezel 220. The second side key button 212 may be configured, for example, to perform power ON/OFF function, electronic device wake-up/sleep function, or the like. According to one embodiment, one or more of the key button 210 may be disposed in at least a portion of the lower area, except for the display 201 on the front surface 2001 of the electronic device 200. The key button 210 may perform a home key button function. Additionally, a fingerprint recognition sensor device may be disposed on the top surface of the home key button. The home key button may be configured to perform a first function (e.g., a home screen return function, a wake-up/sleep function, or the like) by physically pressing the home key button, and to perform a second function (e.g., a fingerprint recognition function) by swiping the top surface of the home key button. Although not illustrated, touch pads may be disposed on the left and right of the key button 210 so as to perform a touch function.

A rear camera device 213 may be disposed on the rear surface 2002 of the electronic device 200, and one or more electronic components 214 may be disposed at a side of the rear camera device 213. The electronic components 214 may include at least one of an illuminance sensor (e.g., an optical sensor), a proximity sensor (e.g., an optical sensor), an infrared sensor, an ultrasonic sensor, a heartrate sensor, a flash device, etc.

The front surface 2001 may include a planar portion 2011, and a left bent portion 2012 and a right bent portion 2013 formed on the left and right of the planar portion 2011, respectively. The front surface 2001 of the electronic device 200 may include a display 201, as well as other parts, and the front surface 2001 may be covered by one window. The left bent portion 2012 and the right bent portion 2013 may be formed to extend in an x-axis direction of the electronic device 200 of FIG. 2A from the planar portion 2011. Each of the left bent portion 2012 and the right bent portion 2013 may be configured as part of the side surfaces of the electronic device 200. In such a case, the left bent portion 2012 and the right bent portion 2013 may be configured as the side surfaces of the electronic device 200 together with the left and right bezel portions 221 and 222 of the metal bezel 220, respectively. Without being limited thereto, however, the front surface 2001, on which the display 201 is provided, may include at least one of the left bent portion 2012 and the right bent portion 2013. For example, the front surface 2001 may be configured to include only the left bent portion 2012 along the planar portion 2011, or to include only the right bent portion 2013 along the planar portion 2011.

According to various embodiments, the front surface 2001 may include a flexible display module that is applied to at least a portion of the window that includes the left bent portion 2012 and the right bent portion 2013 on the left and right thereof, and the lower side of the window. The area including the flexible display module may be configured as the display 201. The window may be formed in a manner in which the top and rear surfaces thereof are simultaneously bent (hereinafter, a "3D type"). Without being limited thereto, the window may be formed in a manner where the left and right portions of the top surface are formed in a curved shape and the rear surface is formed in a planar shape (hereinafter, "2.5D type"). The window may be formed of, for example, a transparent glass material (e.g., a sapphire glass) or a transparent synthetic resin material.

The electronic device 200 may control the display module so as to selectively display information. According to one embodiment, the electronic device 200 may control the display module so as to configure a screen only on the planar portion 2011. Or, the electronic device 200 may control the display module to configure a screen by any one of the left bent portion 2012 and the right bent portion 2013 together with the planar portion 2011. The electronic device 200 may also control the display module to configure a screen of at least one of the left bent portion 2012 and the right bent portion 2013, excluding the planar portion 2011.

The rear surface 2002 of the electronic device 200 may also be entirely formed by one window 215, and may include a planar portion 2151 that is substantially formed in the central portion to be the center. A left bent portion 2152 and a right bent portion 2153 may be formed on the left and right of the planar portion 2151, respectively. According to one embodiment, the window 215 may be configured as the 2.5D type in which the left bent portion 2152 and the right bent portion 2153 of the outer surface are formed in a curved shape and the rear surface is formed as a planar surface. Without being limited thereto, however, the window 215 may be formed in the 3D type similar to the window disposed on the front surface 2001.

According to one embodiment, each of the left bent portion 2152 and the right bent portion 2153 may be configured as a part of the side surfaces of the electronic device 200. In such a case, the left bent portion 2152 and the right bent portion 2153 may be configured as the side surfaces of the electronic device 200 together with the left and right bezel portions 221, 222 of the metal bezel 220. Without being limited thereto, however, the rear surface 2002 may include at least one of the left bent portion 2152 and the right bent portion 2153. According to one embodiment, the rear surface 2002 may be configured to include only the left bent portion 2152 along the planar portion 2151, or to include only the right bent portion 2153 along the planar portion 2151.

According to various embodiments, the upper side left and right corner portions and the lower side left and right corner portions of the front surface 2001 may be formed to be simultaneously inclined in the x-axis direction, the y-axis direction, and the z-axis direction in FIG. 2A while the window is bent. With this shape, the upper side left and right corner portions and the lower side left and right corner portions of the metal bezel 220 may be formed such that the heights thereof gradually decrease towards the side surfaces, respectively.

Figure 3:
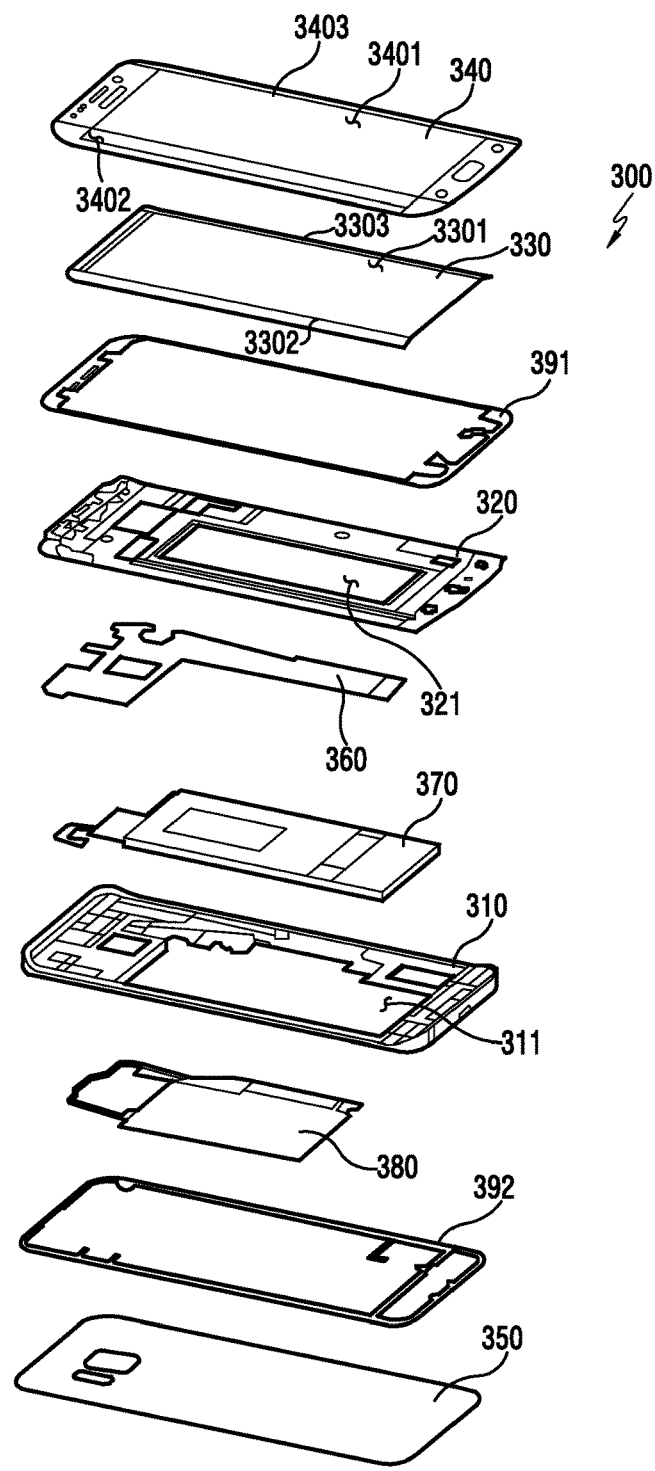
FIG. 3 is a perspective view illustrating an electronic device in a disassembled state according to various embodiments of the present disclosure.

FIG. 3 is a perspective view of an electronic device 300 in a disassembled state according to various embodiments of the present disclosure. Hereinafter, the electronic device 300 illustrated in FIG. 3 may be an electronic device which is the same as the above-described electronic device 200.

Referring to FIG. 3, the electronic device 300 may include a printed circuit board (PCB) 360, a bracket 320, a display module 330, and a front window 340, which may be sequentially disposed on the upper side of the housing 310. The electronic device may include a wireless power transmission/reception member 380 and a rear window 350, which may be sequentially disposed on the lower side of the housing 310. The battery pack 370 may be accommodated in the accommodation space 311 of the housing 310. According to one embodiment, the battery pack 370 and the PCB 360 may be disposed not to overlap with each other. The display module 330 may be fixed to the bracket 320, and the front window 340 may be attached to the bracket 320 by a first adhesive member 391. The rear window 350 may be attached to the housing 310 by a second adhesive member 392.

The front window 340 may include a planar portion 3401, and a left bent portion 3402 and a right bent portion 3403 bent in opposite directions from the planar portion 3401. The front window 340 may be positioned on the electronic device 300 so as to form the front surface, and is formed of a transparent material so as to display a screen presented by the display module 330 and to provide an input/output window for various sensors. While the left bent portion 3402 and the right bent portion 3403 are shown as being formed in the 3D type, a shape in which the upper and lower portions as well as the left and right portions are single-bent, or a shape in which the upper, lower, left, and right portions are dual-bent, may also apply. A touch panel may be further disposed on the rear surface of the front window 340 and may receive touch input signals.

The display module 330 may also be formed in a shape corresponding to that of the front window 340 (a shape having a curvature corresponding to that of the front window 340). The display module 330 may include a planar portion 3301, and left and right bent portions 3302 and 3303 on the left and right of the planar portion 3301. According to one embodiment, a flexible display module may be used as the display module 330. In the case of a where the rear surface of the front window 340 is formed in a planar shape (hereinafter, 2D type or 2.5 D type), since the rear surface of the front window 340 is planar, an ordinary Liquid Crystal Display (LCD) or an OCTA (On-Cell Touch Active-Matrix Organic Light-Emitting Display) may be applied.

The first adhesive member 391 is used to fix the front window 340 to a bracket 320 disposed within the electronic device 300, and may be a kind of tape, such as a double-sided tape, or a liquid adhesive. According to one embodiment, when the double-sided tape is applied as the first adhesive member 391, PolyEthylene Terephthalate (PET) or a functional base may be applied as the internal base of the first adhesive member 391. For example, by using a base formed of a foam type or shock-resistive fabric material so as to reinforce the shock resistance, it is possible to prevent the front window from being destroyed by external impact.

The bracket 320 may be used reinforce the electronic device 300 to make it more rigid. The bracket 320 may be formed of at least one metal selected from Al, Mg, and Stainless Steel (STS). The bracket 320 may also be formed of a highly rigid plastic in which glass fibers are contained, or may be formed of a combination of a metal and a plastic. According to one embodiment, when a metal member and a non-metal member are used in combination, the bracket 320 may be formed by insert-molding the non-metal member to the metal member. The bracket 320 is placed on the rear surface of the display module 330. The bracket 320 may have a shape (curvature) that is similar to the shape of the rear surface of the display module 330 and may support the display module 330.

An elastic member, such as a sponge or a rubber, and an adhesive layer, such as a double-sided tape or a kind of sheet, such as a single-sided tape, may be additionally disposed between the bracket 320 and the display module 330 to protect the display module 330. A section of the bracket 320 may further include a hole area 321. The hole area 321 may provide a marginal space in consideration of a change of a component during use, such as the swelling of the battery pack 370. According to one embodiment, as needed, a sheet-type meal or composite material may be added to the corresponding hole area 321 so as to reinforce the internal rigidity, or an auxiliary device for improving a thermal characteristic, an antenna characteristic, or the like may be further provided in the hole area 321. The bracket 320 may be fastened to the housing 310 (e.g., the rear cover) so as to form a space therein, and at least one electronic component may be disposed in such a space. The electronic component may include the PCB 360. Without being limited thereto, however, the electronic component may include an antenna device, a sound device, a power supply device, a sensor device, or the like in addition to the PCB 360.

According to various embodiments, the battery pack 370 may supply power to the electronic device 300. Because one surface of the battery pack 370 may be close to the display module 330 and the other surface may be close to the rear window 350, when the battery pack 370 swells during charging, the display module 330 and/or the rear window 350 may be deformed or destroyed. In order to prevent this, a space (swelling gap) may be provided between the battery pack 370 and the display module 330 and the rear window 350. In one embodiment the battery pack 370 may be integrated with the electronic device 300. Without being limited thereto, however, when the rear window 350 is implemented to be attachable to/detachable from the electronic device 300, the battery pack 370 may be implemented to be attachable/detachable.

According to various embodiments, the housing 310 forms the exterior of the electronic device 300 and may be coupled to the bracket 320 so as to form an internal space. A front window 340 may be disposed on the front surface of the housing 310, and a rear window 350 may be disposed on the rear surface of the housing 310. Without being limited thereto, however, the rear surface of the housing 310 may be implemented by molding a synthetic resin, or by using a metal, a composite of a metal and a synthetic resin, or the like. According to one embodiment, an inter-structure gap formed by the housing 310 and the rear window 350 may prevent the destruction of the rear window 350 from the secondary impact by an internal structure when, for example, the electronic device 300 is dropped.

According to various embodiments, a wireless power transmission/reception member 380 may be disposed on the rear surface of the housing 310. The wireless power transmission/reception member 380 mainly has a thin film form and is attached to one surface of an internally mounted component or an area of the inner surface of the housing 310, in particular to an area that is generally close to the rear window 350. The wireless power transmission/reception member 380 includes a structure that makes contact with the PCB 360 within the housing 310. The wireless power transmission/reception member 380 may be embedded or attached as a component of the battery pack 370 or the like, or a part of the housing 310.

The second adhesive member 392 may fix the rear window 350 to the housing 310 and may be applied in a form similar to that of the first adhesive member 391 described above.

The rear window 350 may be applied in a form similar to that of the front window 340. According to one embodiment, the surface of the rear window 350 may be formed in a curvature that is more inclined going to the left and right ends. The rear surface of the rear window 350 may be formed in a planar surface to be attached to the housing 310 by the second adhesive member 392.

Figure 4A:
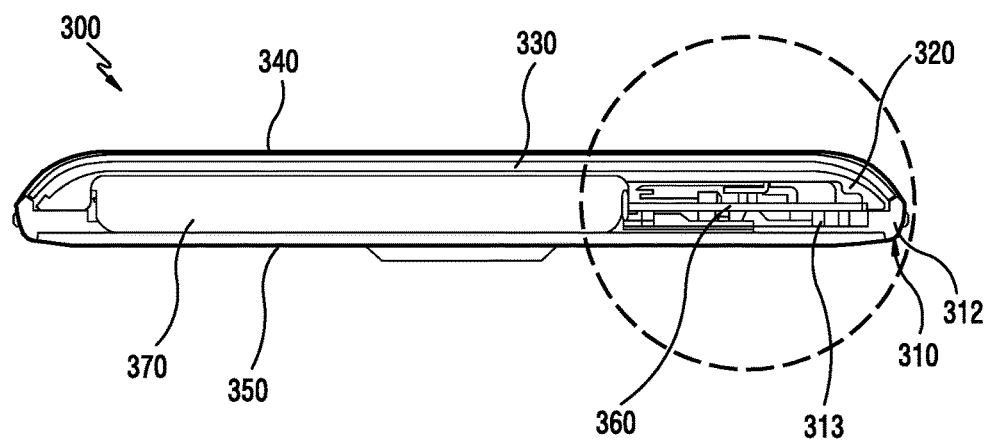
FIG. 4A is a cross-sectional view illustrating the electronic device in the assembled state according to various embodiments of the present disclosure.
Figure 4B:
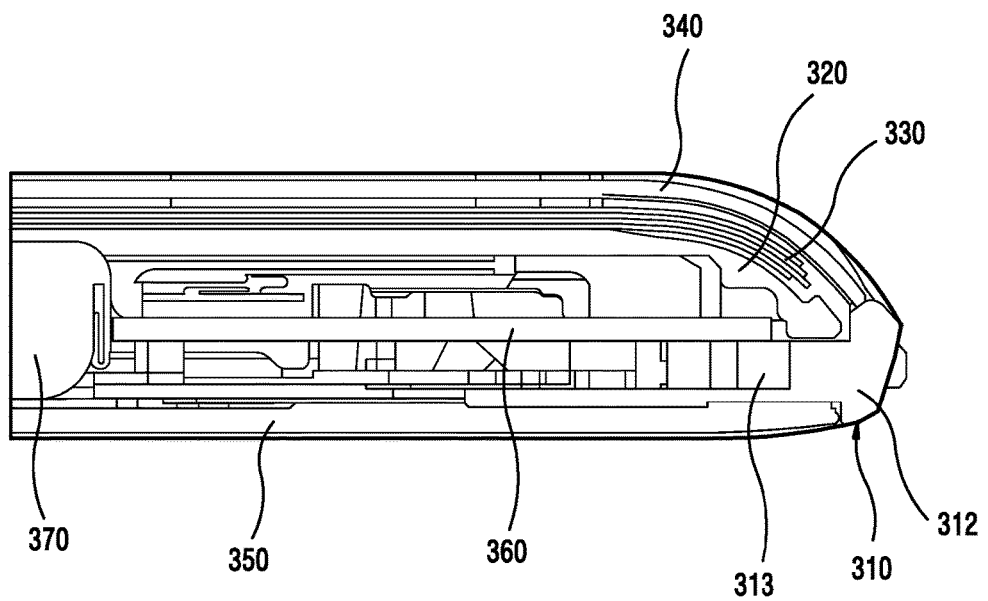
FIG. 4B is a cross-sectional view of a portion of FIG. 4A according to various embodiments of the present disclosure.

FIG. 4A is a cross-sectional view illustrating the electronic device 300 in the assembled state according to various embodiments of the present disclosure. FIG. 4B is a cross-sectional view of a portion of FIG. 4A according to various embodiments of the present disclosure.

Referring to FIGS. 4A and 4B, the bracket 320 may be fixed to the housing 310. The housing 310 may be formed by injection-molding a non-metal member 313 to the metal bezel 312. The display module 330 may be fixed to the front surface of the bracket 320, and the front window 340 may be disposed on the display module 330. The front window 340 may be attached to the bracket 320 by the first adhesive member 391 adjacent to an end of the housing 310. The front window 340 may be attached to the bracket 320 by the first adhesive member 391 to correspond to the shape thereof on the end of the housing 310. The front window 340 may be attached to the bracket 320 by the first adhesive member 391 while being supported by the end of the housing 310. The front window 340 may have a uniform thickness and may be formed in a shape having a predetermined curvature. The planar portion and the left and right bent portions of the front window 340 may have a predetermined thickness.

The rear window 350 may also be fixed to the housing 310 by the second adhesive member 392. The rear window 350 may be formed to have a thickness that is reduced towards the left and right edges (a shape which is formed in the 2.5D type).

According to various embodiments, in the space between the bracket 320 and the housing 310, an electronic component, such as the PCB 360, may be accommodated, and the battery pack 370 may be disposed to avoid the PCB 360.

Figure 5A:
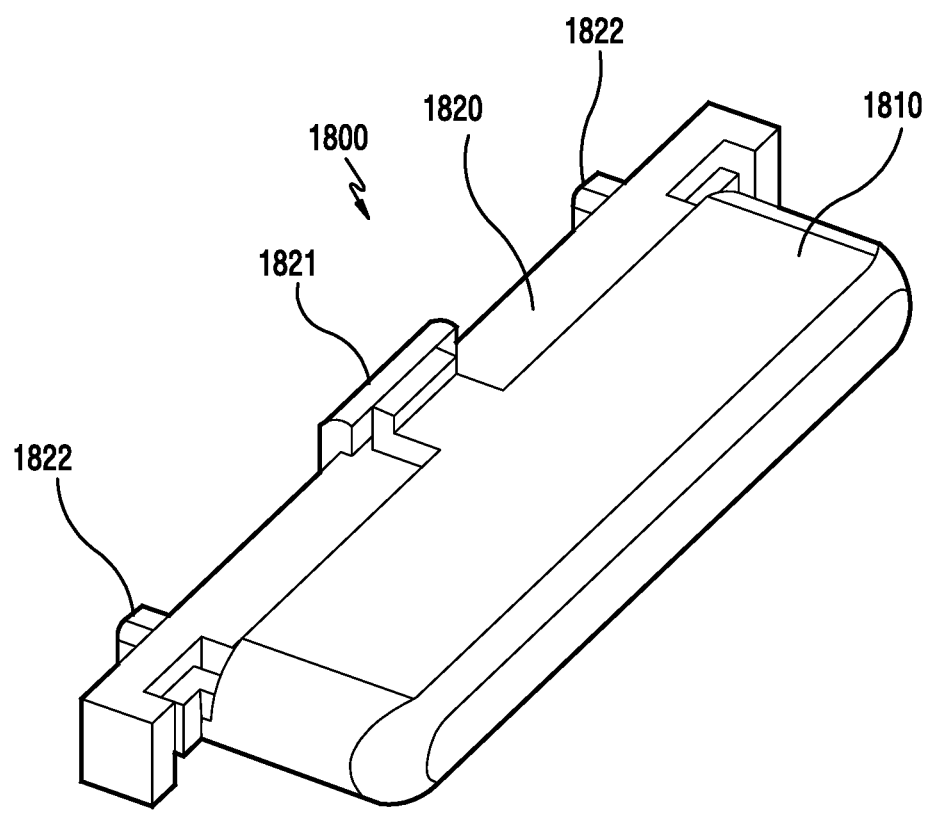
FIGS. 5A and 5B are configuration views of a key button according to various embodiments of the present disclosure.
Figure 5B:
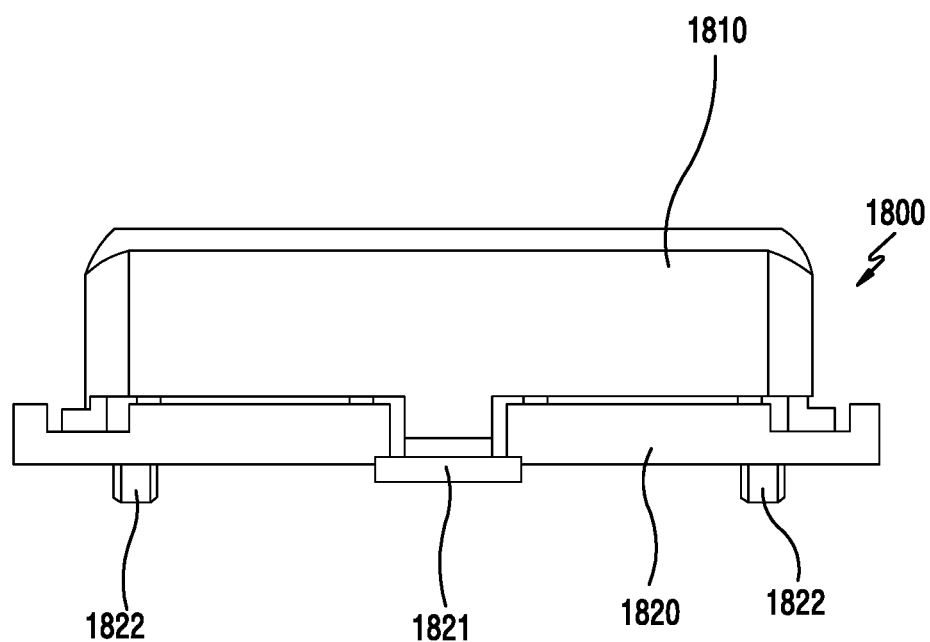

FIGS. 5A and 5B are configuration views of a key button 1800 according to various embodiments of the present disclosure. Referring to FIGS. 5A and 5B, the key button 1800 may include a key top 1810, and a key base 1820 that is fixed to the key top 1810.

The key top 1810 may be formed of metal and/or a synthetic resin material and the key top 1810 may be partially exposed to the outside of the electronic device (e.g., a side surface) so that a corresponding function of the electronic device (e.g., a volume up/down function, a wake-up/sleep function, or a power ON/OFF function) may be performed by the user pushing the key top 1810.

The key base 1820 may be fixed to the bottom of the key top 1810, and the key base 1820 may serve as a locking member that allows the key top 1810 to be partially exposed while preventing the key top 1810 from being separated. The key base 1820 may include a press portion 1821 protruding from the bottom surface of the key base 1820. According to one embodiment, the press portion 1821 may be disposed so as to press a dome key (e.g., a metal dome key) 1852 (see FIG. 6) that is disposed on an FPCB 1850 (see FIG. 6) of a FPCB assembly 1830 (see FIG. 6) to be described later. The key base 1820 may include support pieces 1822 that protrude on either sides of the press portion 1821. The support pieces 1822 may be near the ends of the key base 1820 and may serve to prevent the key top 1810 from being excessively pushed, and to support the press portion 1821 to smoothly press the dome key 1852. The key base 1820 may be formed of, for example, an elastic material such as rubber, silicon, and/or urethane.

According to one embodiment, the key top 1810 and the key base 1820 may be integrally formed as one member using a single material. Without being limited thereto, however, a member formed of an elastic resin material may be formed on the key top formed as a metallic member through insert molding.

Figure 6:
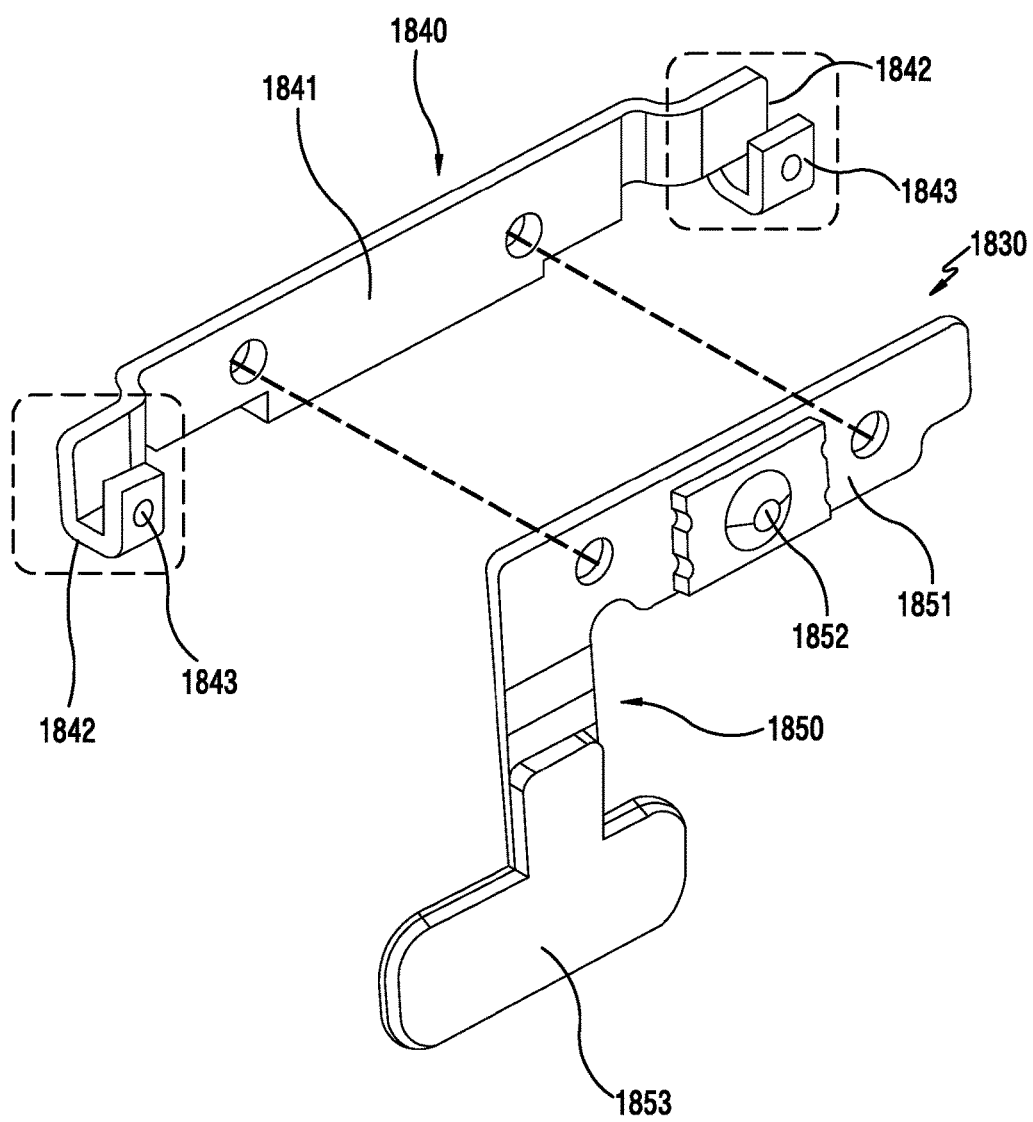
FIG. 6 is a perspective view illustrating a Flexible Printed Circuit Board (FPCB) assembly in a disassembled state according to various embodiments of the present disclosure.

FIG. 6 is a perspective view illustrating an FPCB assembly 1830 in a disassembled state according to various embodiments of the present disclosure. Referring to FIG. 6, the FPCB assembly 1830 may include a support plate 1840 and an FPCB 1850 supported by the support plate 1840.

The FPCB 1850 may include a circuit body 1851 attached to the support plate 1840, and a connection terminal portion 1853 drawn out from the circuit body 1851 and connected to the PCB of the electronic device. A dome key (e.g., a metal dome key) 1852 may be disposed on the circuit body 1851, where the dome key 1852 may be at a position corresponding to the press portion 1821 of the above-described key base 1820, and may perform an electric switching function.

The support plate 1840 may include a plate body 1841 that supports the circuit body 1851 of the FPCB 1850, and elastic pieces 1842 that are bent to a predetermined shape at opposite ends of the plate body 1841. The elastic pieces 1842 may have a "U" shape, and may have an inwardly or outwardly biased elasticity, and the elasticity may help to maintain their shape. Accordingly, when the elastic pieces 1842 are seated in elastic piece seating recess 2011 (see FIG. 7A), the support plate 1840 may be kept from being separated from the housing. Each elastic piece 1842 may include one or more of a fixing protrusion 1843 that protrudes from the outer surface thereof. The fixing protrusion 1843 may be inserted in to an opening in the elastic piece seating recess 2011 so as to support the fixing of the support plate 1840. The elastic pieces 1842 may be formed in various shapes, such as a "⊂" shape, a circular shape, an oval shape, and an "S" shape, in addition to the "U" shape. According to one embodiment, the plate body 1841 of the support plate 1840 and the circuit body 1851 of the FPCB 1850 may be attached to each other by using a double-sided tape, or other methods of coupling.

FIGS. 7A to 7E are views illustrating a process of installing the key button 1800 and the FPCB assembly 1830 to the housing 2000 of an electronic device according to various embodiments of the present disclosure.

Figure 7A:
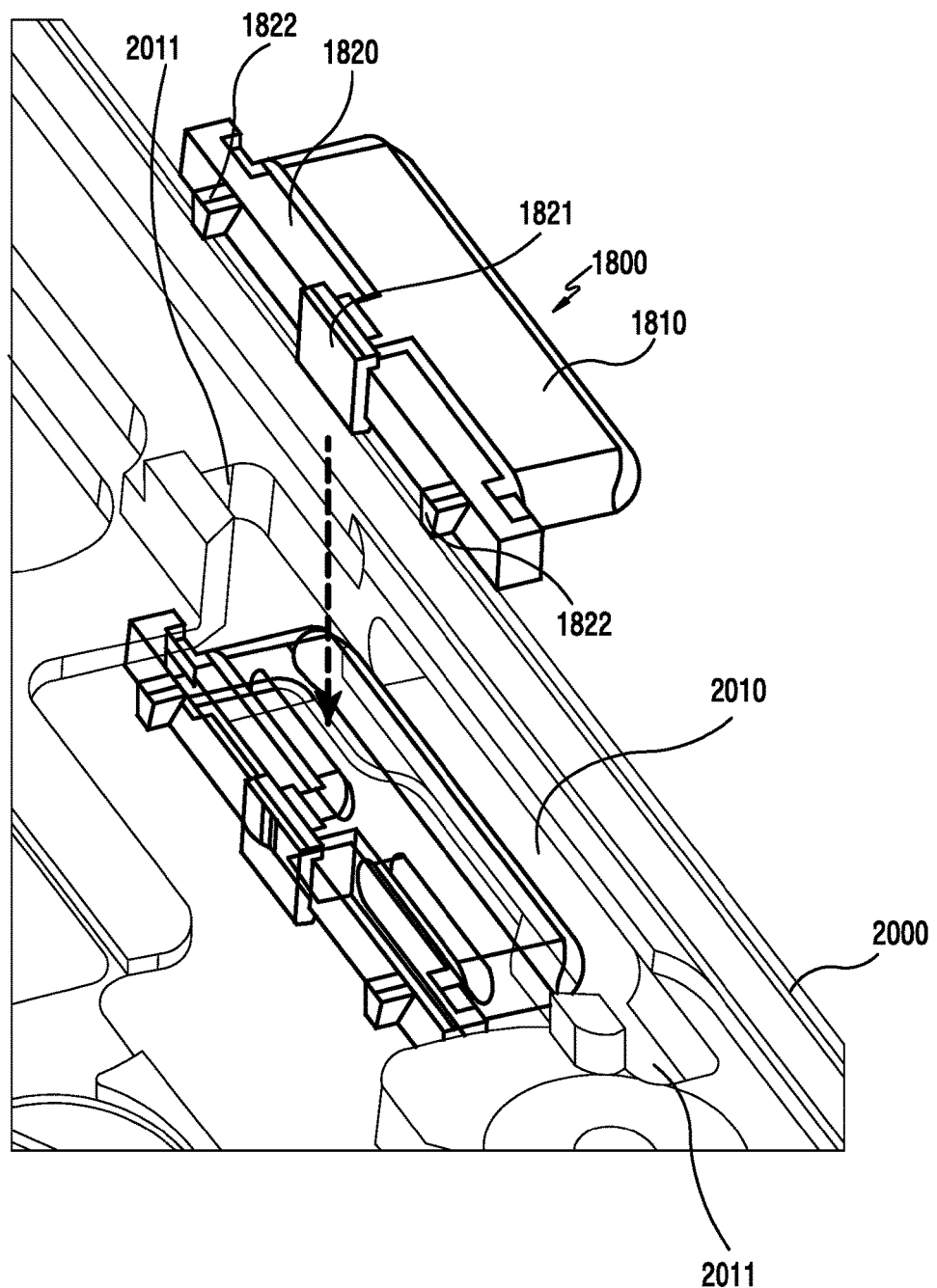
FIGS. 7A to 7E are views illustrating a process of installing the key button and the FPCB assembly to the housing of an electronic device according to various embodiments of the present disclosure.
Figure 7B:
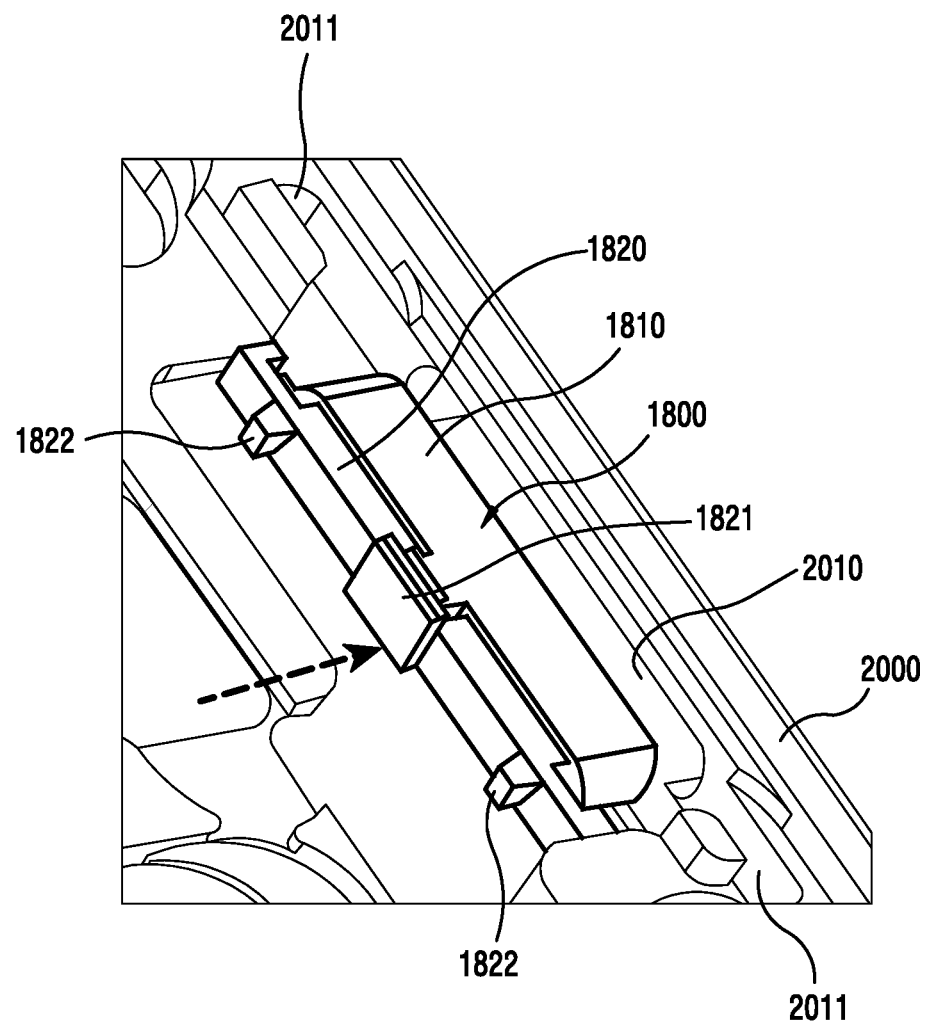

Referring to FIGS. 7A and 7B, the housing 2000 (e.g., the rear housing) of the electronic device may be formed with a key top passage hole 2010. The key top passage hole 2010 may be formed in a size that allows the key top 1810 of the key button 1800 to pass through but prevents the key base 1820 from passing through.

According to various embodiments, the key button 1800 may be lowered from the upper side of the housing 2000 in a direction indicated by the arrow as illustrated in FIG. 7A, and then may be moved forward toward the key top passage hole 2010 as illustrated in FIG. 7B. By such an operation, the key top 1810 may be partially exposed to the outside of the housing 2000 through the key top passage hole 2010 so that a user may be able to push the key top 1810.

Figure 7C:
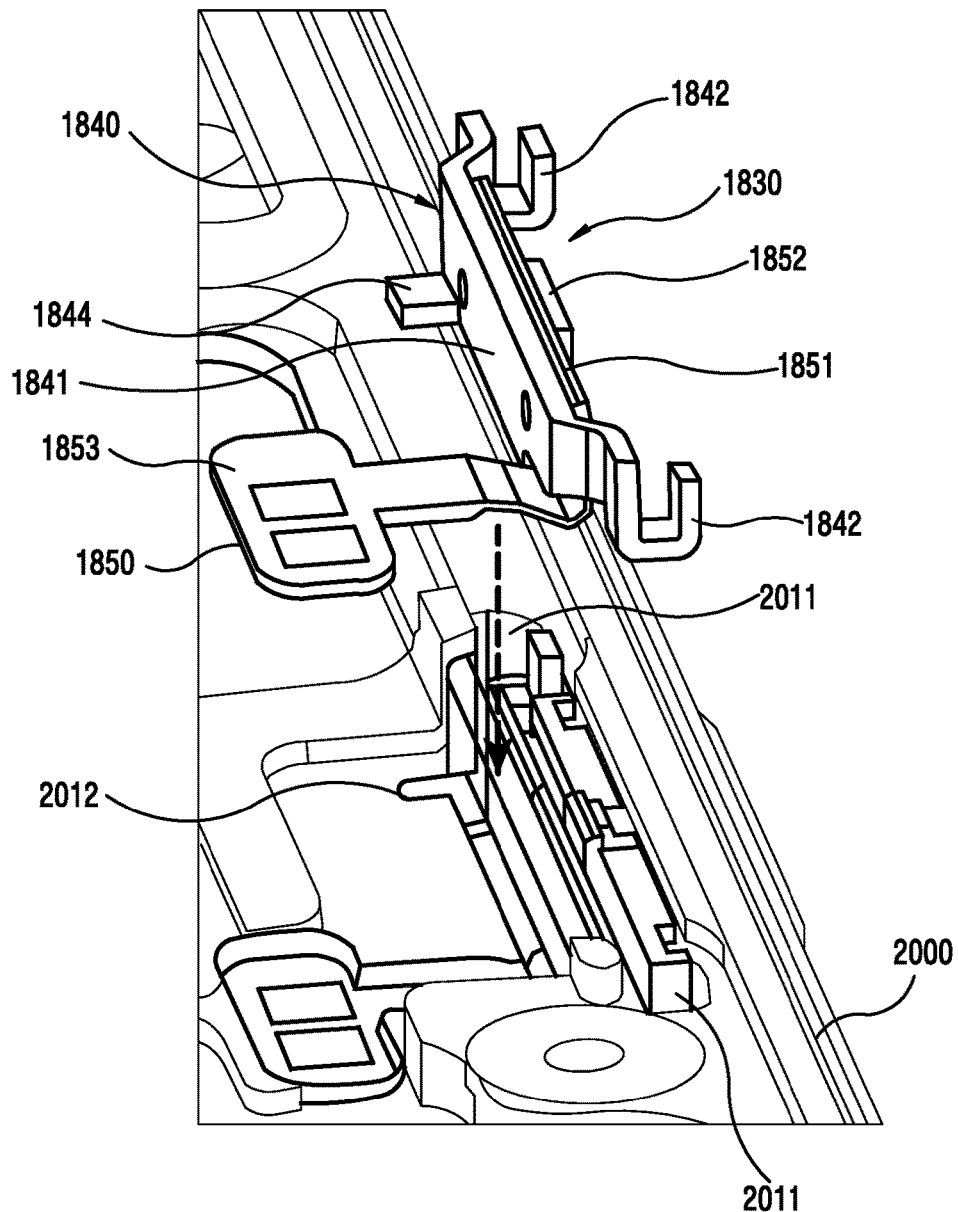

Referring to FIG. 7C, while the key button 1800 is in place with the key top 1810 partially passing through the key top passage hole 2010 of the housing 2000, the FPCB assembly 1830 may be dropped down behind the key button 1800, as indicated by the arrow. In such a case, the elastic pieces 1842, which are formed on the opposite ends of the support plate 1840 of the FPCB assembly 1830, may be tightly seated in the elastic piece seating recess 2011 that is formed in the housing 2000. This is because the elastic pieces 1842 are seated in the elastic piece seating recess 2011 while maintaining the outwardly biased elastic force. Each elastic piece seating recess 2011 may be formed with an opening (not illustrated), and the fixing protrusions 1843, which are formed to protrude from the elastic pieces 1842, may be seated in the openings to support fixing the support plate 1840 to the housing 2000. According to one embodiment, the plate body 1841 of the support plate 1840 may include a fixing piece 1844 that is formed to extend orthogonally to the plate body 1841. When the support plate 1840 is fixed to the housing 2000, the fixing piece 1844 is seated in a fixing piece seating recess 2012 that is formed on the inner surface of the housing 2000 so that the support plate

1840, which is mounted on the housing 2000, can be prevented from moving left and right.

Figure 7D:
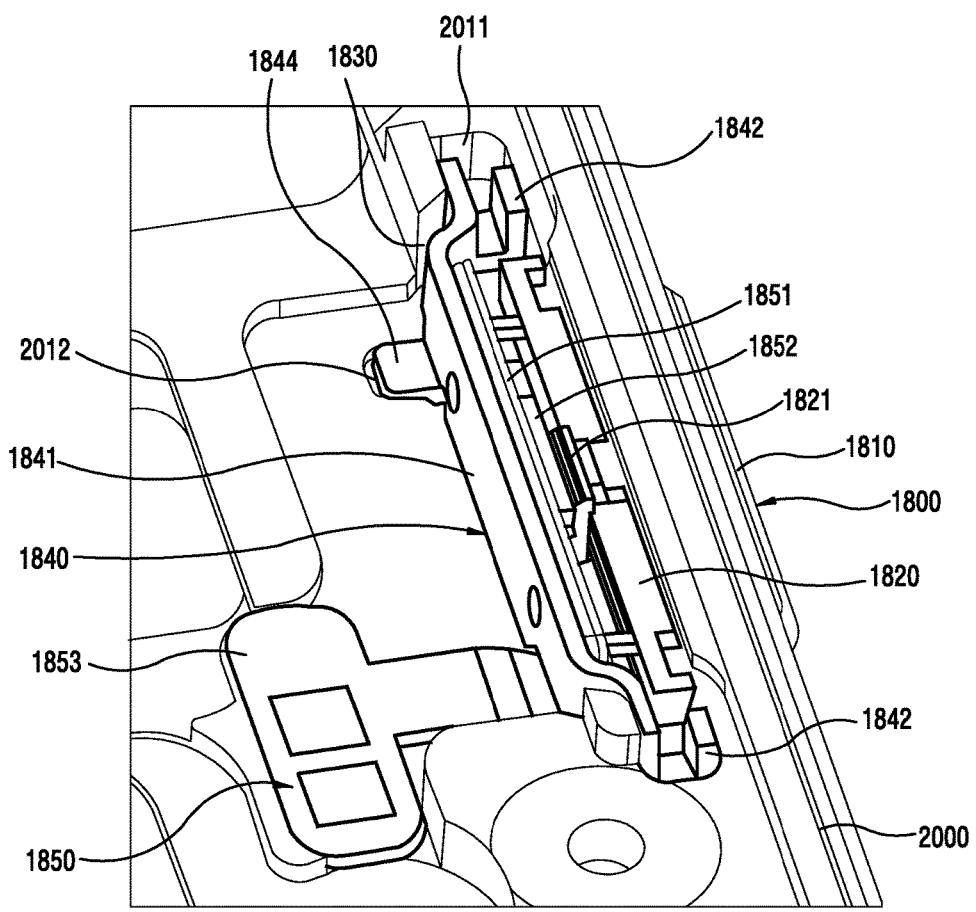
Figure 7E:
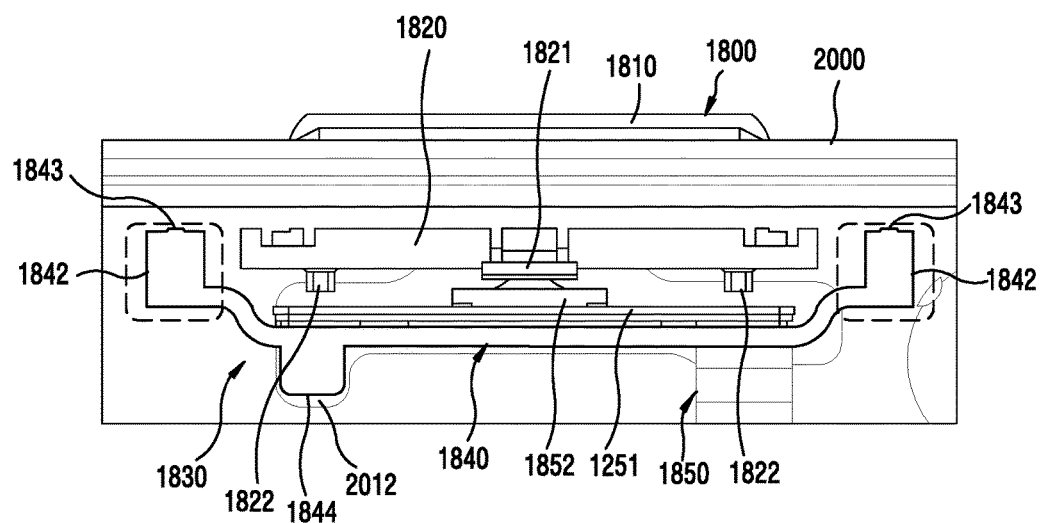
Figure 8A:
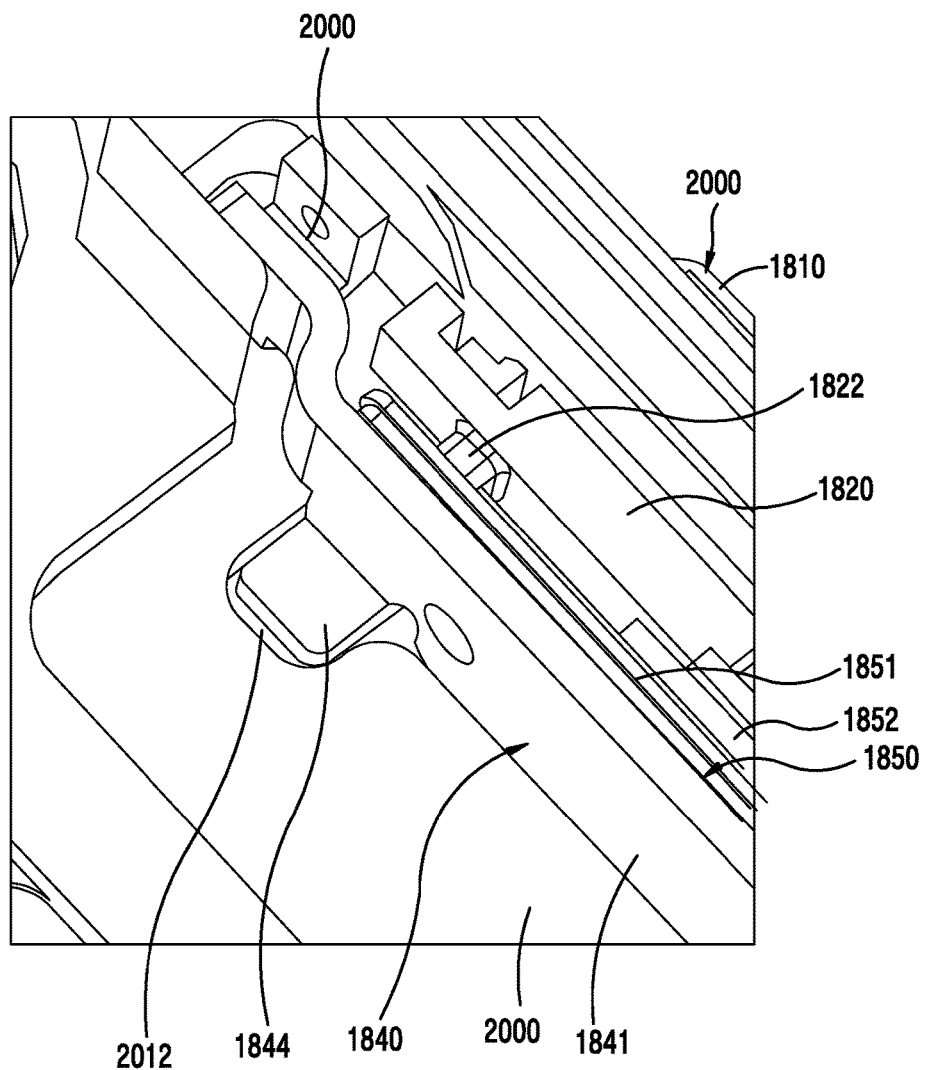
FIGS. 8A to 8D are configuration views illustrating the FPCB assembly installed in the housing of the electronic device according to various embodiments of the present disclosure.
Figure 8B:
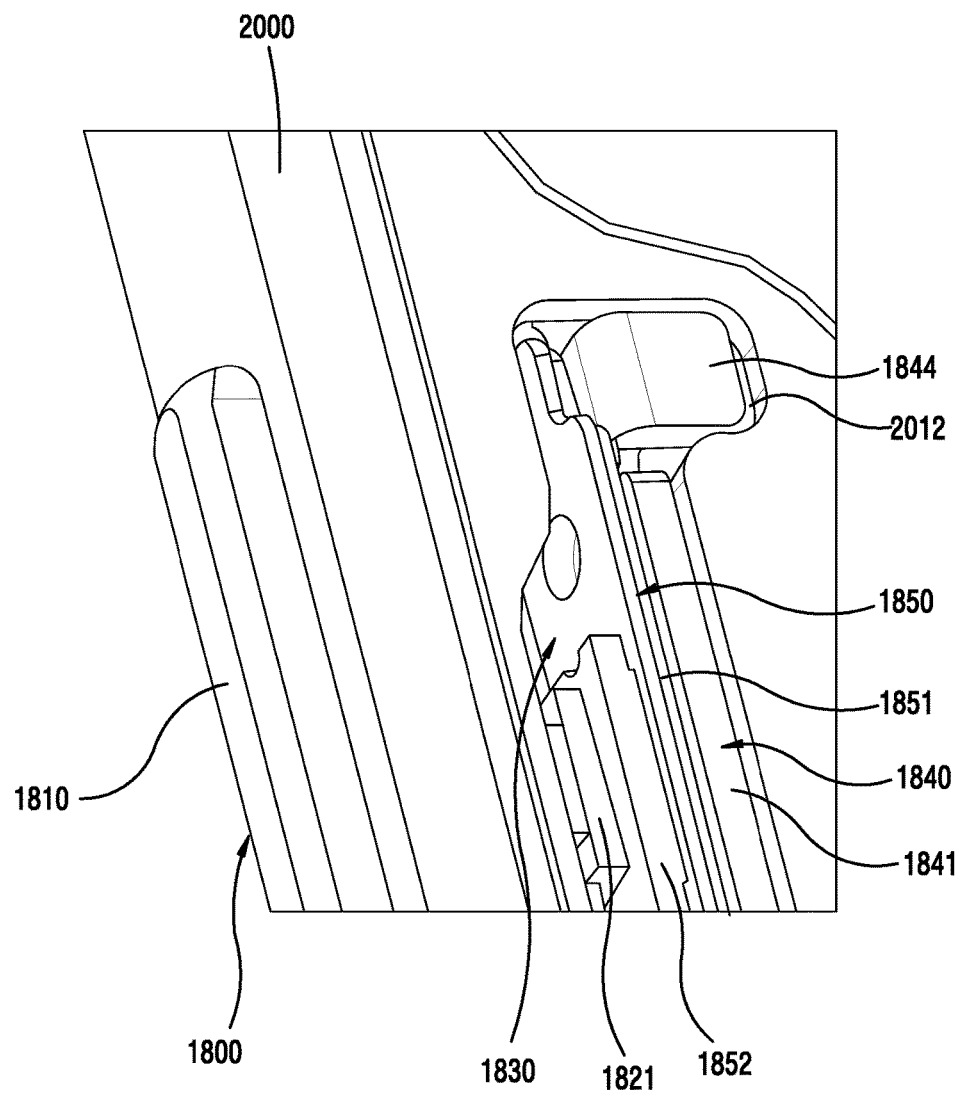
Figure 8C:
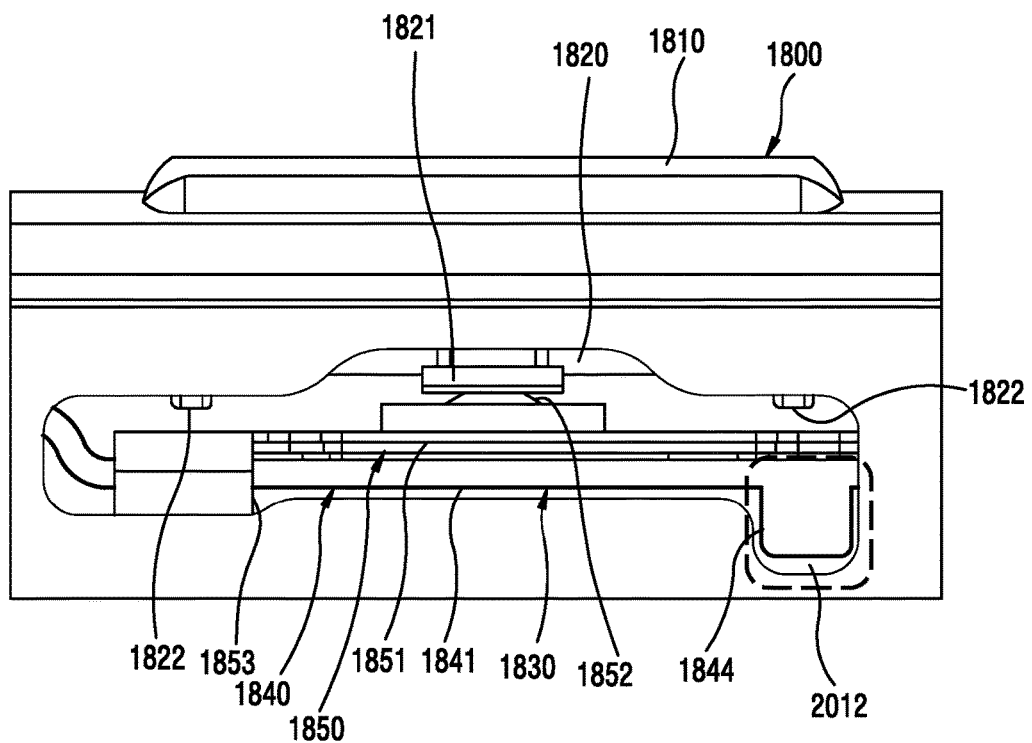
Figure 8D:
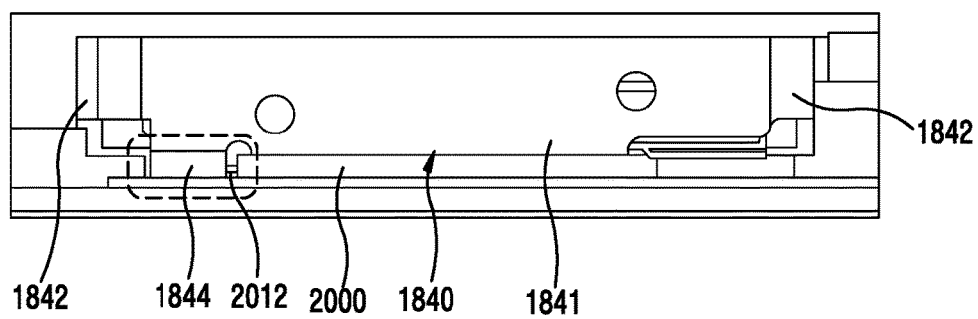

Referring to FIGS. 7D and 7E, the key button 1800 mounted in the housing 2000 may hold the key top 1810 partially exposed to the outside of the housing 2000, and the key button 1800 may be supported by the support plate 1840 of the FPCB assembly 1830 behind the key button 1800. According to one embodiment, the press portion 1821, which is formed on the key base 1820 of the key button 1800, may maintain the state in which it is in contact with the dome key 1852 of the circuit body 1851 that is supported by the plate body 1841 of the FPCB assembly 1830. In such a case, because the elastic pieces 1842 that are formed on the opposite ends of the support plate 1840 are fixed to the elastic piece seating recess 2011 formed in the housing 2000, the support plate 1840 does not move even if the key button 1800 is pressed. By pressing the press portion 1821 of the key base 1820, the dome key 1852, which is disposed on the circuit body 1851 of the FPCB 1850, may be pressed to, for example, make or break an electrical circuit.

Because pressing the key top 1810 is implemented only by the support plate 1840 of the FPCB assembly 1830 without any other instrument (e.g., a bracket) where the key button 1800 is assembled inside the housing 2000, the performance test of the key button 1800 can be easily implemented.

FIGS. 8A to 8D are configuration views illustrating a portion where the FPCB assembly 1830 is installed in the housing 2000 of the electronic device according to various embodiments of the present disclosure. Descriptions will be omitted for those elements already described above.

Referring to FIGS. 8A to 8D, the support plate 1840 of the FPCB assembly 1830 may be firmly fixed at its opposite ends by the elastic pieces 1842, but may move left and right. Accordingly, on the plate body 1841 of the support plate 1840, the fixing piece 1844 may be formed orthogonally to the plate body 1841. Accordingly, when the support plate 1840 is fixed to the housing 2000, the fixing piece 1844 may also be seated in the fixing piece seating recess 2012 in the housing 2000.

According to one embodiment, the fixing piece seating recess 2012 may be an opening that penetrates the bottom surface of the housing 2000, and when the fixing piece 1844 is applied to the fixing piece seating recess 2012, the fixing piece 1844 may be seated such that the surface of the fixing piece 1844 and the bottom surface of the housing 2000 are flush with each other. While the fixing piece 1844 is shown as a rectangular shape, it need not be so limited. For example, the fixing piece 1844 may be formed in various shapes so as to prevent the support plate 1840 from being moved left and right. According to one embodiment, one fixing piece 1844 is formed on the plate body 1841 of the support plate 1840. However, in the case where the plate body 1841 and a space of the housing 2000, which corresponds to the plate body 1841, are available, a plurality of fixing pieces 1844 may be formed.

Figure 9:
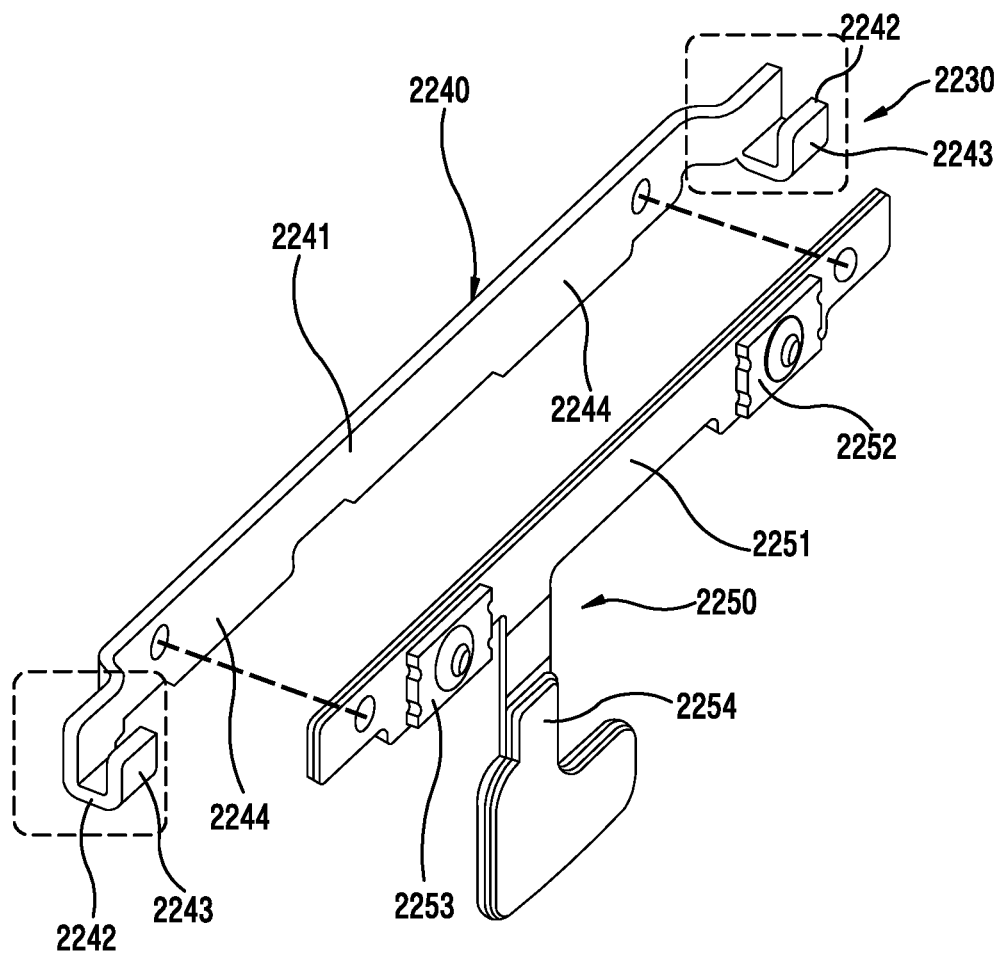
FIG. 9 is an exploded perspective view of an FPCB assembly according to various embodiments of the present disclosure.

FIG. 9 is a perspective view of an FPCB assembly 2230 in a disassembled state according to various embodiments of the present disclosure. The above-mentioned FPCB assembly 1830 has been illustrated and described above with reference to one key button 1800, an FPCB 1850 having one dome key 1852 applied to the key button 1800, and a support plate 1840 that supports the FPCB 1850. FIG. 9 illustrates an FPCB assembly 2230 having two dome keys 2252 and 2253 that support two separate key buttons 1800, and hereinafter, the FPCB assembly 2230 will be described. Accordingly, the configuration of each of the two separately applied key buttons 1800 is the same as that of the key button 1800 illustrated in FIGS. 5A and 5B. Thus, the detailed descriptions for the configuration of the key buttons 1800 will be omitted.

Referring to FIG. 9, the FPCB assembly 2230 may include a support plate 2240 and an FPCB 2250 supported by the support plate 2240.

According to various embodiments, the FPCB 2250 may include a circuit body 2251 attached to the support plate 2240, and a connection terminal portion 2254 drawn out from the circuit body 2251 and connected to the PCB of the electronic device. According to one embodiment, the pair of dome keys (e.g., metal dome keys) 2252 and 2253 may be disposed on the circuit body 2251 at a predetermined interval. The pair of dome keys 2252 and 2253 may be disposed at the positions corresponding to the press portions 1821, which are formed on the corresponding key bases 1820 of the key buttons 1800. Therefore, each dome key 2252 or 2253 may be physically operated by pressing the corresponding key button 1800.

According to various embodiments, the support plate 2240 may include a plate body 2241 that supports the circuit body 2251 of the FPCB 2250, and elastic pieces 2242 that are bent in a predetermined shape on the opposite ends of the plate body 2241. According to one embodiment, the elastic pieces 2242 may have a "U" shape and may have elasticity so that the leg portions of the "U" are biased to the outside in relation to each other. Accordingly, when the elastic pieces 2242 are seated in an elastic piece seating recess 2316 (see FIG. 10A) in a housing 2300 to be described later (see FIG. 10A), the support plate 2240 may be kept in place in the housing 2300.

According to one embodiment, each elastic piece 2242 may include at least one of the fixing protrusion 2243 that protrudes from the outer surface thereof, and the fixing protrusion 2243 may be fixedly seated in an opening formed in the elastic piece seating recess 2316 so as to assist the fixing of the support plate 2240. The elastic pieces 2242 may be formed in various shapes that may have elasticity, such as a "⊂" shape, a circular shape, an oval shape, and an "S" shape besides the "U" shape, and may resist bending. Accordingly, the elastic pieces 2242 may provide tension to keep the support plate 2240 in place. According to one embodiment, the plate body 2241 of the support plate 2240 and the circuit body 2251 of the FPCB 2250 may be attached to each other through a method of bonding by using a double-sided tape, or the like.

FIGS. 10A to 10E are views illustrating a process of installing the key buttons 1800 and the FPCB assembly 2230 to the housing 2300 of the electronic device according to various embodiments of the present disclosure.

Figure 10A:
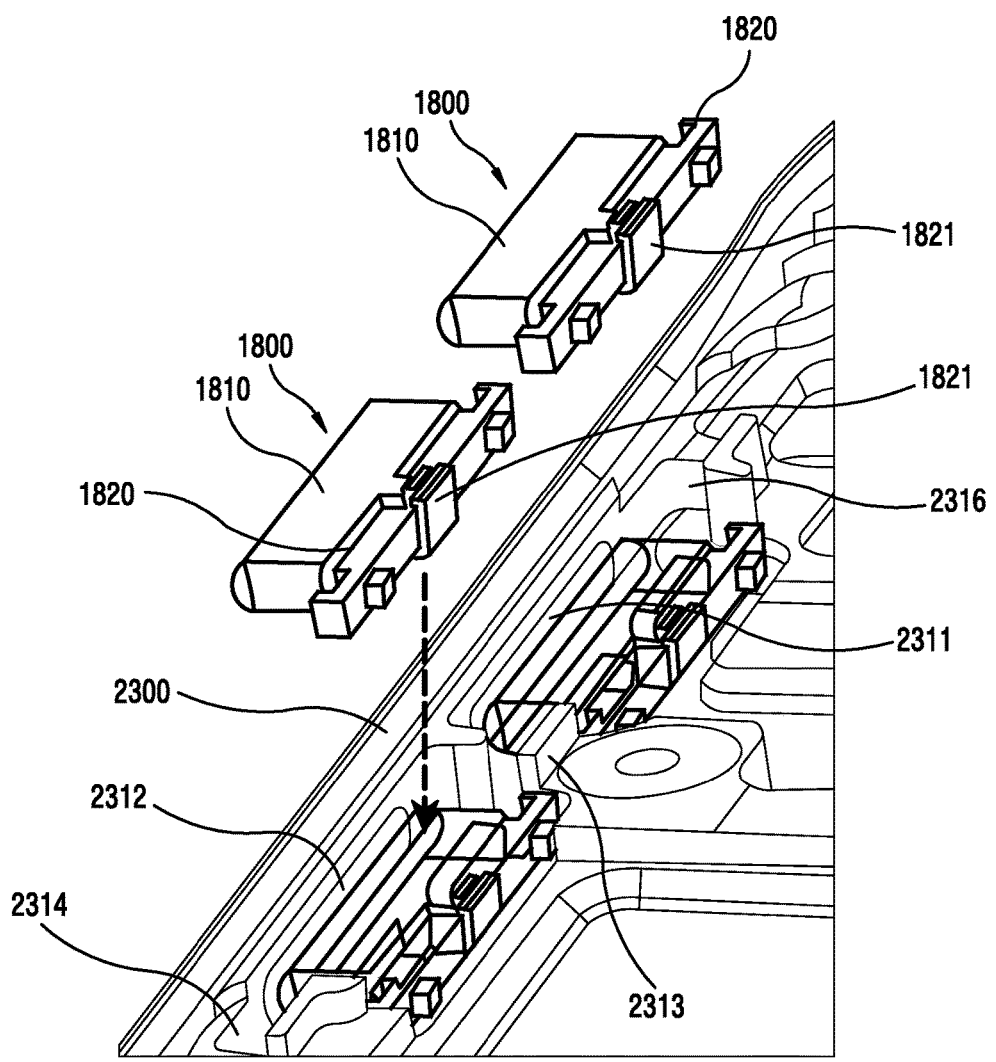
FIGS. 10A to 10E are views illustrating a process of installing the key buttons and the FPCB assembly to the housing of the electronic device according to various embodiments of the present disclosure.
Figure 10B:
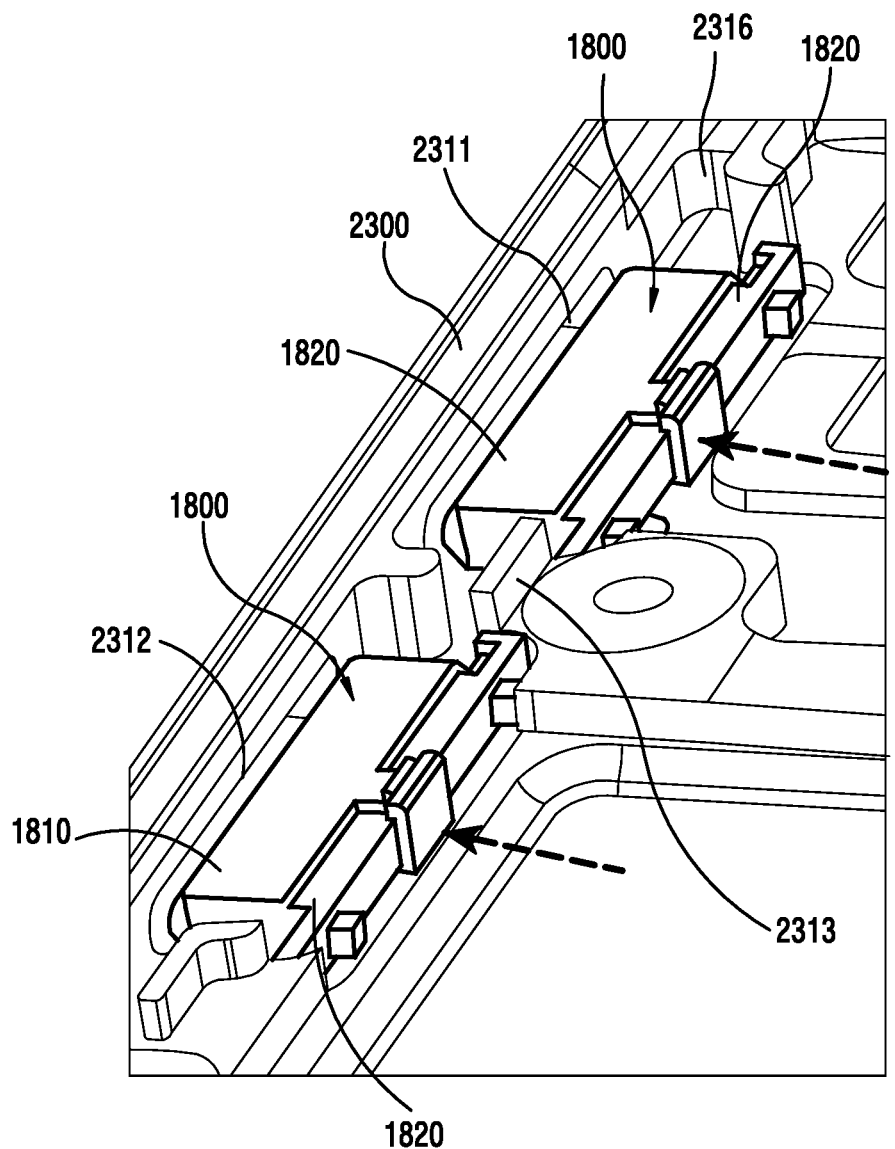

Referring to FIGS. 10A and 10B, in the housing 2300 (e.g., a rear housing) of the electronic device, one pair of key top passage holes 2311 and 2312 may be formed at a predetermined interval. The pair of key top passage holes 2311 and 2312 may be formed to have a size that allows the key tops 1810 of the key buttons 1800 to pass through the key top passage holes 2311 and 2312, respectively. According to one embodiment, the key top passage holes 2311 and 2312 may be formed to have a size that allows only the key tops 1810 to pass through the key top passage holes 2311 and 2312, respectively, and to prevent the key bases 1820 fixed to the key tops 1810 from passing through the key top passage holes 2311 and 2312.

According to various embodiments, the key buttons 1800 may be lowered from the upper side of the housing 2300 in the direction indicated by an arrow as illustrated in FIG.

10A, and then may be moved forward toward the key top passage holes 2311 and 2312 as illustrated in FIG. 7B. Through such an operation, the key buttons 1800 may be placed in the key top passage holes 2311 and 2312 of the housing 2300 by the key bases 1820, and the key tops 1810 may be partially exposed to the outside of the housing 2300 through the key top passage holes 2311 and 2312.

Figure 10C:
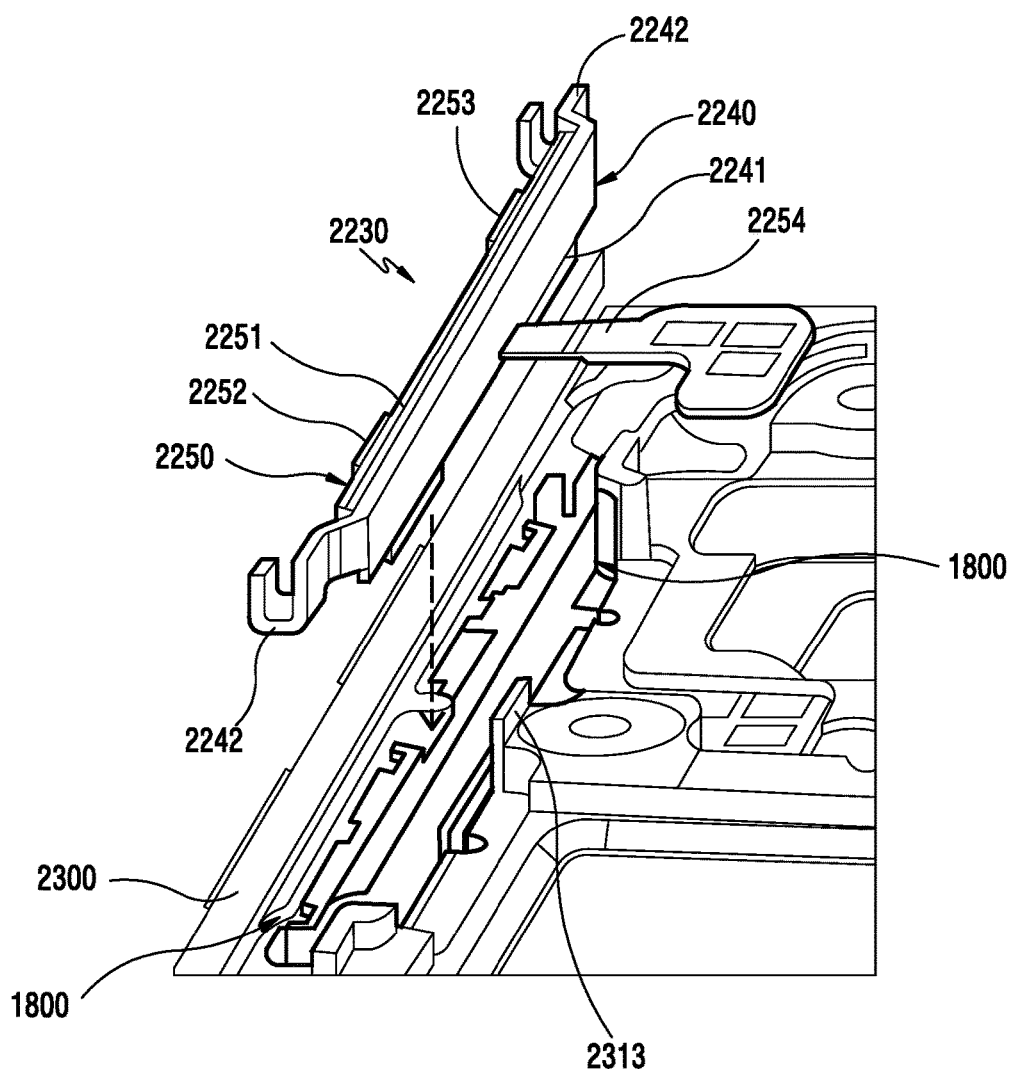

Referring to FIG. 10C, where the key tops 1810 of the pair of key buttons 1800 partially pass through the key top passage holes 2311 and 2312 of the housing 2300, the FPCB assembly 2230 may be mounted on the rear side of the key tops 1810, in the direction as indicated by the arrow. In such a case, the elastic pieces 2242 formed on opposite ends of the support plate 2240 of the FPCB assembly 2230 may be tightly seated in the elastic piece seating recess 2316 formed in the housing 2300. This is because the elastic pieces 2242 are seated in the elastic piece seating recess 2316 while maintaining an outwardly biased tension. According to one embodiment, the elastic piece seating recess 2316 may be formed with openings (not illustrated) and the fixing protrusions 2243, which are formed to protrude from the elastic pieces 2242, may be seated in the openings so as to assist in fixing the support plate 2240 to the housing 2300.

According to one embodiment, a plate support piece 2313 may be formed to protrude inside the housing 2300 so that the plate support piece 2313 can support the rear side of the plate body 2241 of the support plate 2240. The plate support piece 2313 may prevent the support plate 2240 from moving backward or flexing when the relatively long support plate 2240 is pressed by the key buttons 1800. The plate support piece 2313 may be disposed between the pair of key top passage holes 2311 and 2312, and a plurality of plate support pieces may be formed if space is available.

Figure 10D:
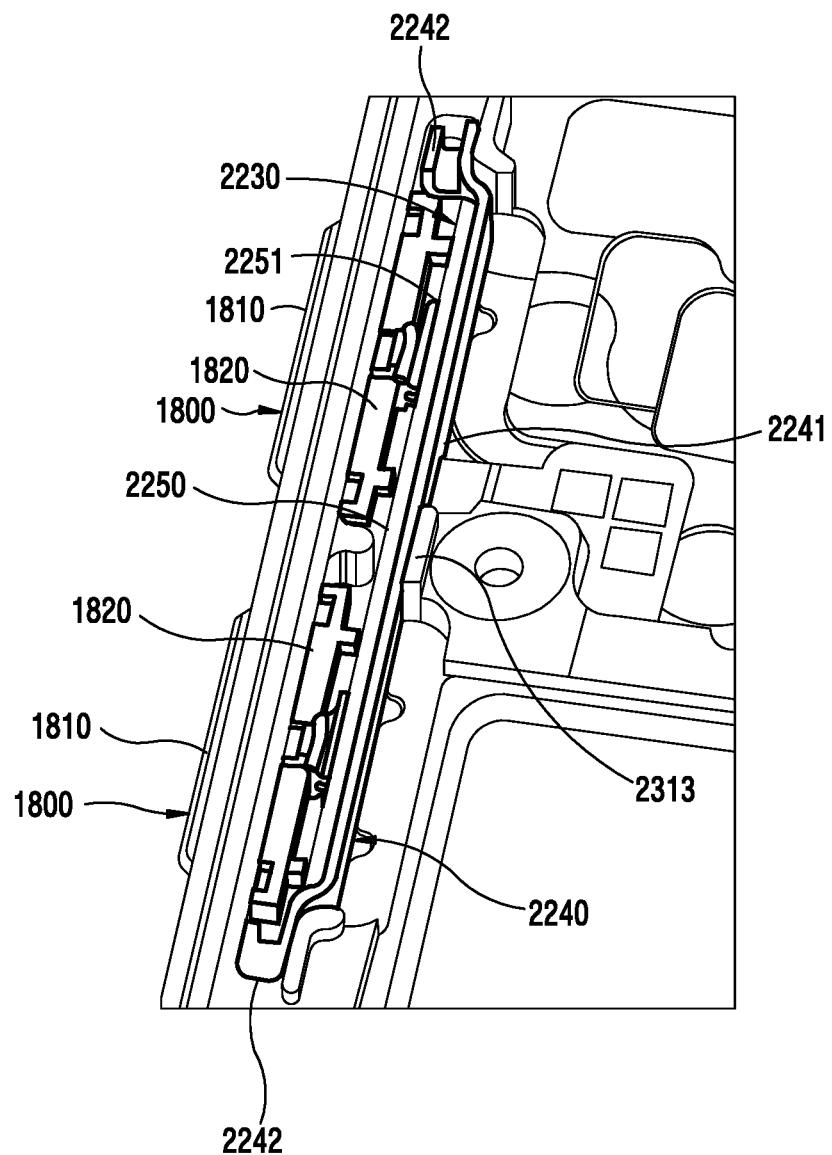
Figure 10E:
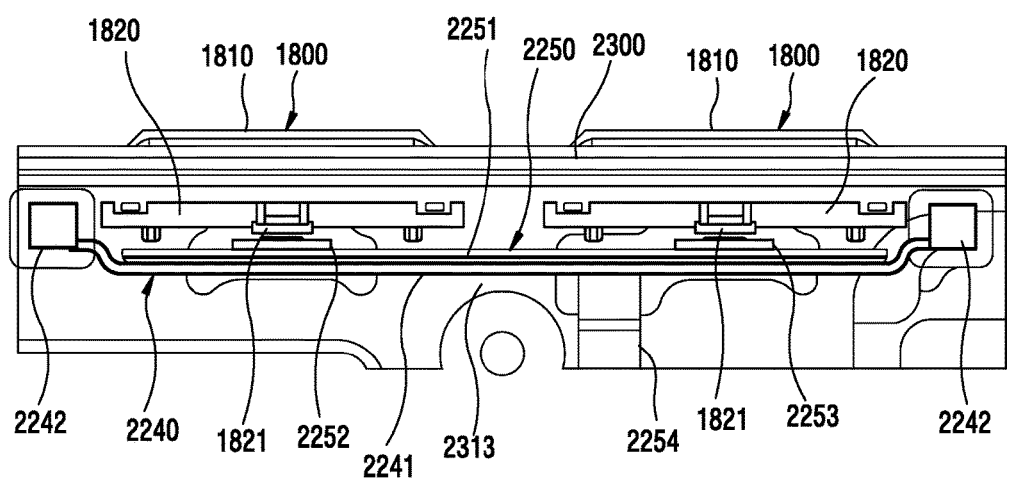
Figure 11A:
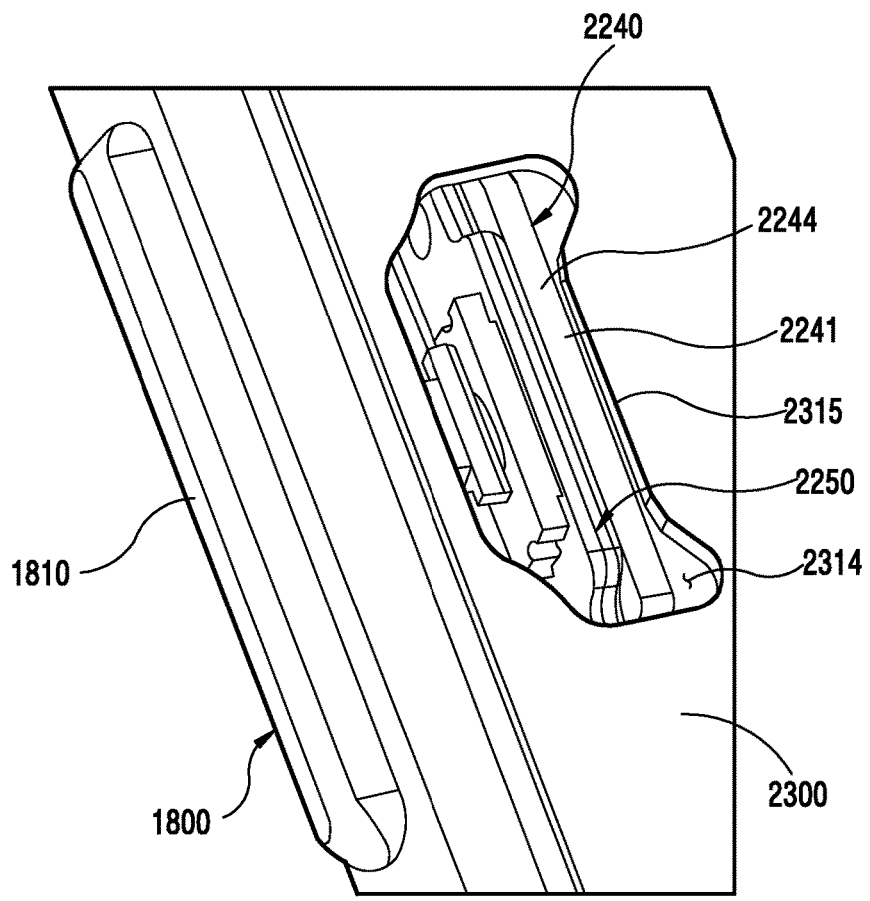
FIGS. 11A to 11D are configuration views illustrating a portion of the FPCB assembly installed in the housing of the electronic device according to various embodiments of the present disclosure.
Figure 11B:
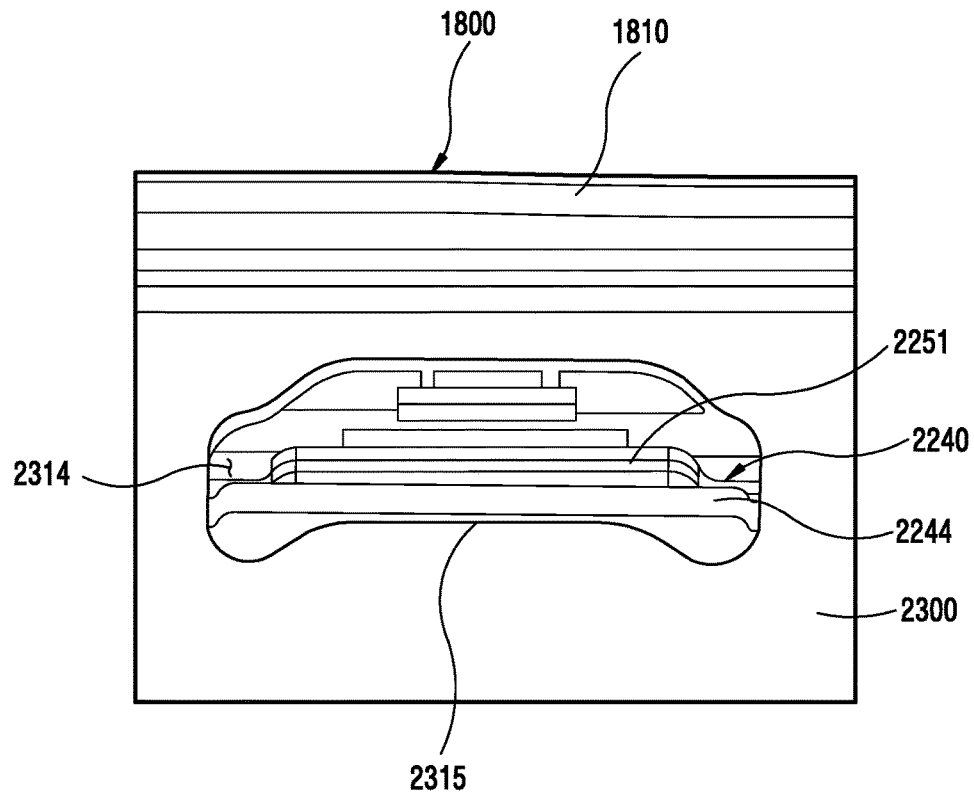
Figure 11C:
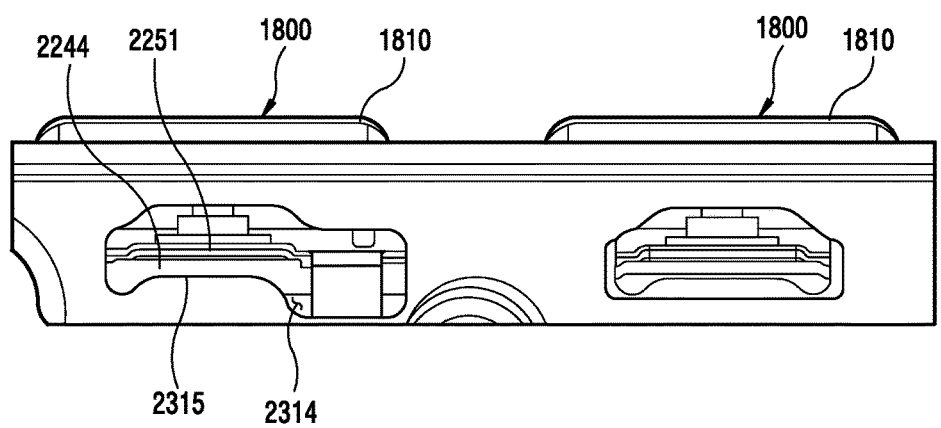
Figure 11D:
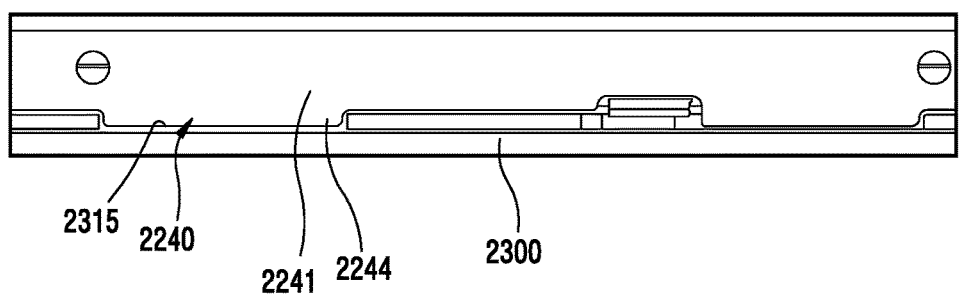

Referring to FIGS. 10D and 10E, the pair of key buttons 1800 mounted in the housing 2300 may partially expose each of the key tops 1810 of the key buttons 1800 to the outside of the housing 2300, and the key buttons 1800 may be supported by the support plate 2240 of the FPCB assembly 2230 from the rear side thereof. The press portions 1821, which are respectively formed on the key bases 1820 of the key buttons 1800, may be in contact with the dome keys 2252 and 2253 of the circuit body 2251 that is supported by the plate body 2241 of the FPCB assembly 2230. In such a case, because the elastic pieces 2242 formed on the opposite ends of the support plate 2240 are fixed to the elastic piece seating recess 2316 formed in the housing 2300, the support plate 2240 is not moved backward even if the key buttons 1800 are pressed, and the dome keys 2252 and 2253 disposed on the circuit body 2251 of the FPCB 2250 can be physically switched by the press portions 1821 of the key bases 1820.

Because the pressing the key tops 1810 can be implemented only by the support of the support plate 2240 of the FPCB assembly 2230 without any other separate instrument (e.g., the bracket) where the key buttons 1800 are assembled in the inside of the housing 2300, performance testing of the key buttons 1800 can be easily implemented.

FIGS. 11A to 11D are configuration views illustrating a portion where the FPCB assembly 2230 is installed in the housing 2300 of the electronic device according to various embodiments of the present disclosure. Descriptions for the same elements as those described above will be omitted.

Referring to FIGS. 11A to 11D, the support plate 2240 of the FPCB assembly 2230 may be fixed in place by the elastic pieces 2242 on the opposite ends thereof. However, because two key buttons 1800 are accommodated, the support plate 2240 may be moved backward by pressing the key buttons 1800. Accordingly, protrusion steps 2244 may be formed to extend at a predetermined interval on the plate body 2241 of the support plate 2240, and the protrusion steps 2244 may be inserted into protrusion step insertion recess 2314 formed in the bottom of the housing 2300. In such a case, the protrusion steps 2244 of the support plate 2240 may be supported by contact steps 2315, which are formed by the periphery of the protrusion step insertion recess of the protrusion step insertion recess 2314. According to one embodiment, the protrusion steps 2244 of the support plate 2240 may be disposed such that they do not protrude from the protrusion step insertion recess 2314 of the housing 2300 after being inserted into the protrusion step insertion recess 2314.

Figure 12A:
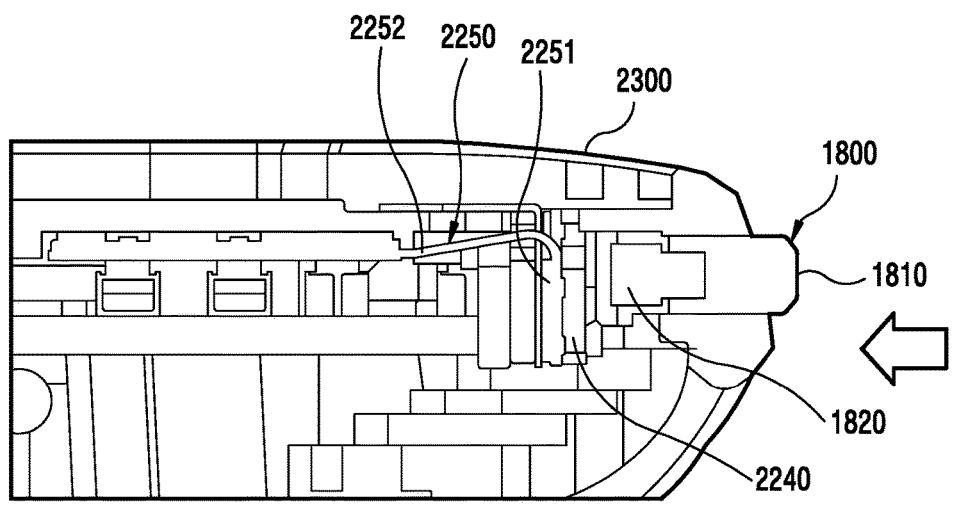
FIGS. 12A to 12C are configuration views illustrating a portion where the key buttons and the FPCB assembly are installed according to various embodiments of the present disclosure.
Figure 12B:
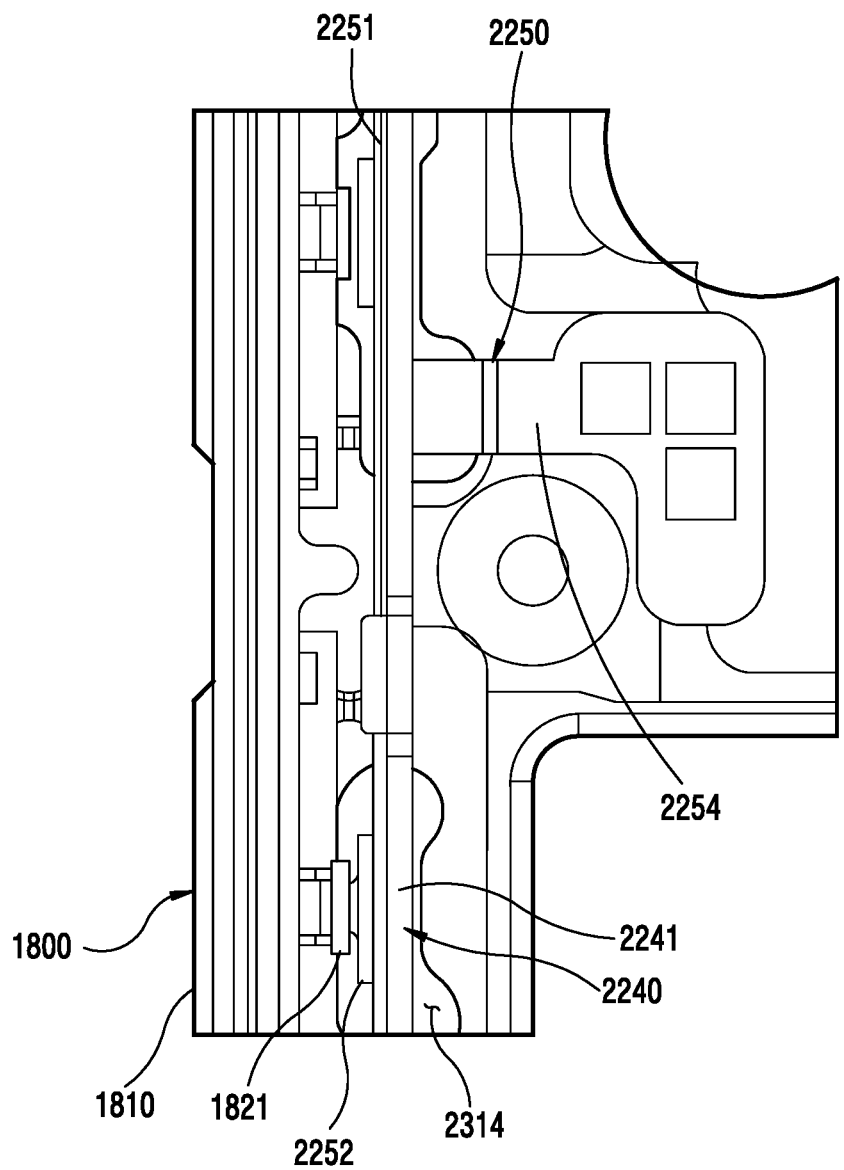
Figure 12C:
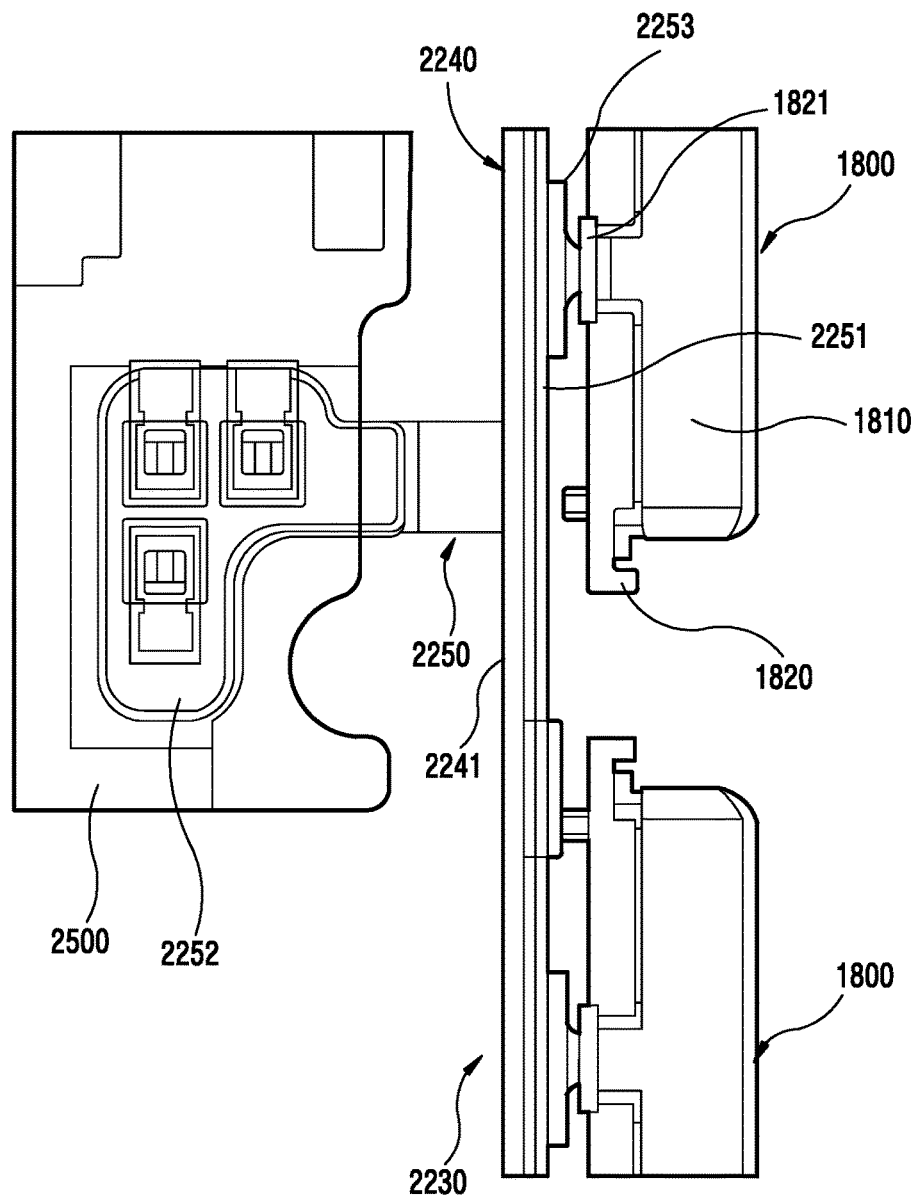

FIGS. 12A to 12C are configuration views illustrating a portion in a state where the key buttons 1800 and the FPCB assembly 2230 are installed according to various embodiments of the present disclosure.

Referring to FIGS. 12A to 12C, the key buttons 1800 may be installed in the housing 2300 of the electronic device to partially protrude. According to one embodiment, when the key tops 1810 of the key buttons 1800 are exposed to the outside of the housing 2300, the support plate 2240 of the FPCB assembly 2230 can be disposed to support the key buttons 1800 at the rear side of the key buttons 1800. In such a state, the press portions 1821 on the key bases 1820 of the key buttons 1800 maintain the state in which they are in contact with the dome keys 2522 disposed on the FPCB 2250 of the FPCB assembly 2230. The connection terminal portion 2254 of the FPCB 2250 may bypass to the rear side of the support plate 2240 so as to maintain the state in which it is electrically connected to the PCB 2500 of the electronic device.

According to various embodiments of the present disclosure, because the key buttons 1800 and the FPCB assembly 2230 are disposed together in the housing 2300, which is one single product, so that the key buttons 1800 can be mounted to the housing without using a separate structure (e.g., a bracket or the like), there is an advantageous effect in the performance test of the key buttons 1800.

Figure 13A:
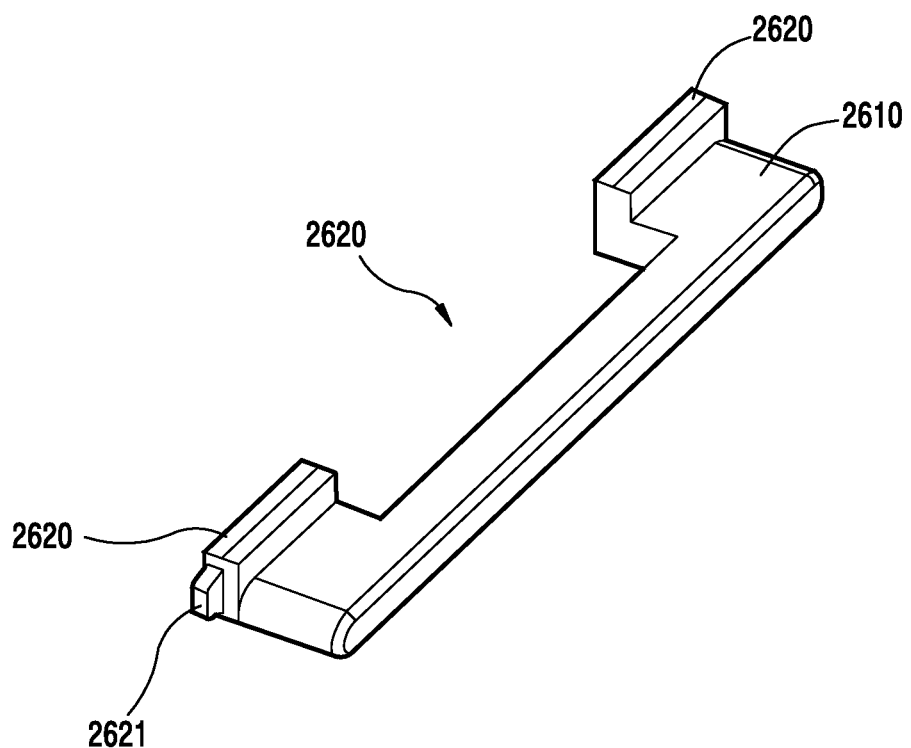
FIGS. 13A and 13B are configuration views of a key button according to various embodiments of the present disclosure.
Figure 13B:
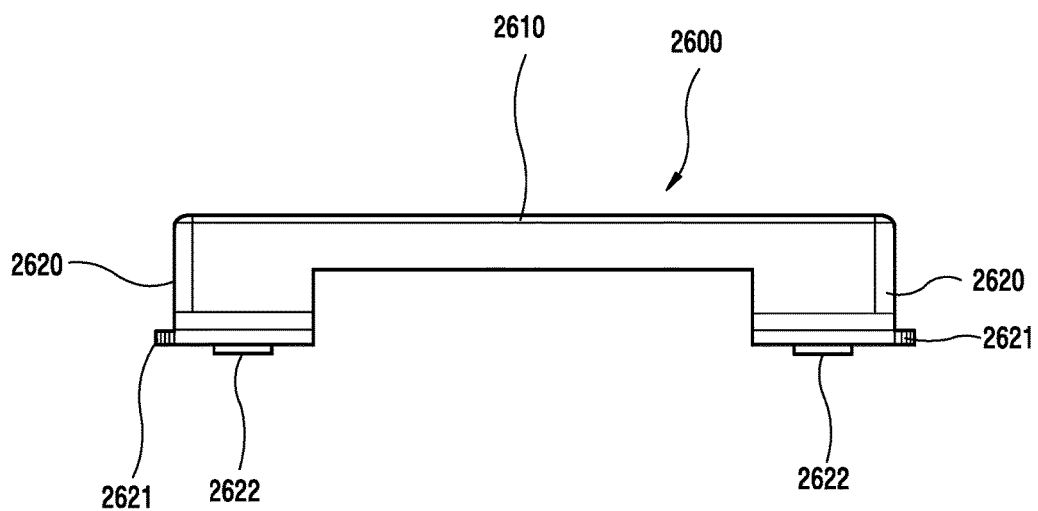

FIGS. 13A and 13B are configuration views of a key button 2600 according to various embodiments of the present disclosure.

Referring to FIGS. 13A and 13B, the key button 2600 may include a key top 2610 having a predetermined length, and key bases 2620 that are disposed on the opposite ends of the key top 2610. According to one embodiment, each of the key bases 2620 may correspond to the FPCB assembly 2230 that includes the FPCB 2250, on which are the pair of dome keys 2252 and 2253, as in the configuration of FIG. 9. A press portion 2622 formed on each of the key bases 2620 may be configured to press a corresponding one of the dome keys 2252 and 2253 of the FPCB assembly 2230. According to one embodiment, a key tab 2621 may be formed to extend outwardly from each key base 2620. The key tab 2621 may serve to keep the key base 2620 to an appropriate place when the key top 2610 passes through a key top passage hole 2701 (see FIG. 14A) formed in the housing 2700 (see FIG. 14A).

FIGS. 14A to 14D are views illustrating a process of installing the key button 2600 and the FPCB assembly 2630 to a housing 2700 of an electronic device according to various embodiments of the present disclosure.

Figure 14A:
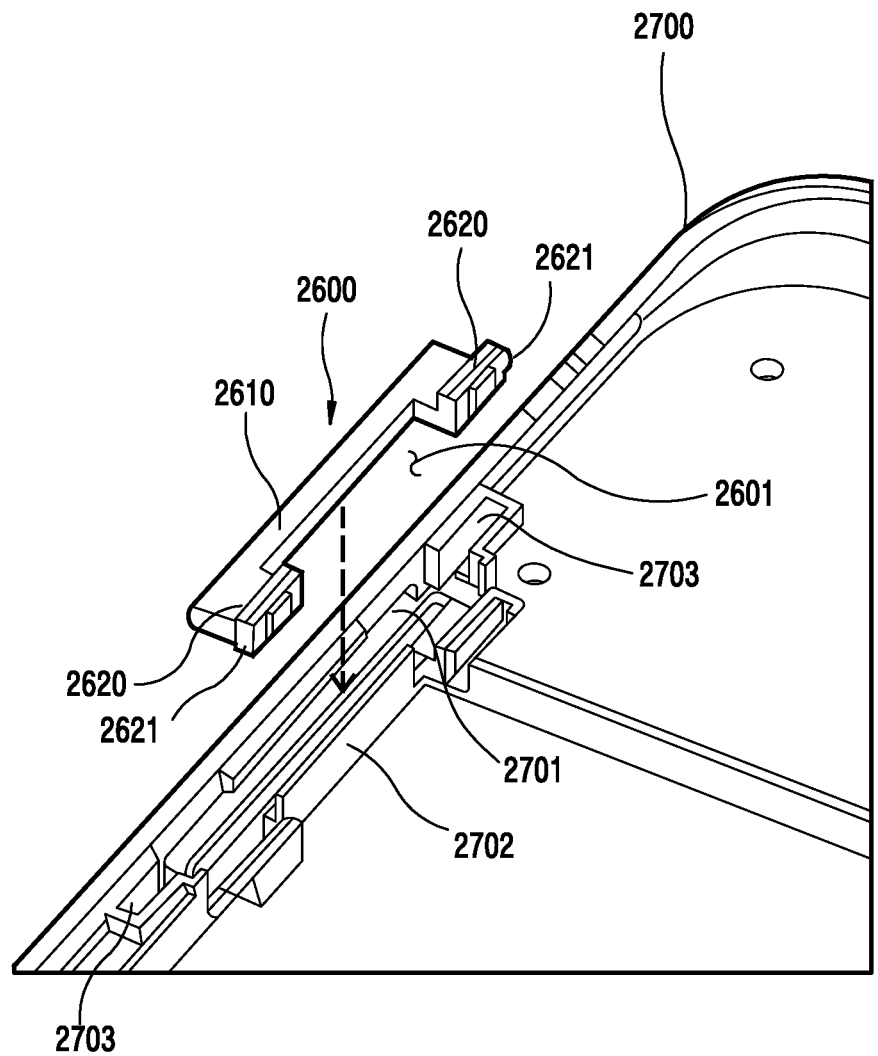
FIGS. 14A to 14D are views illustrating a process of installing the key button and the FPCB assembly to a housing of an electronic device according to various embodiments of the present disclosure.
Figure 14B:
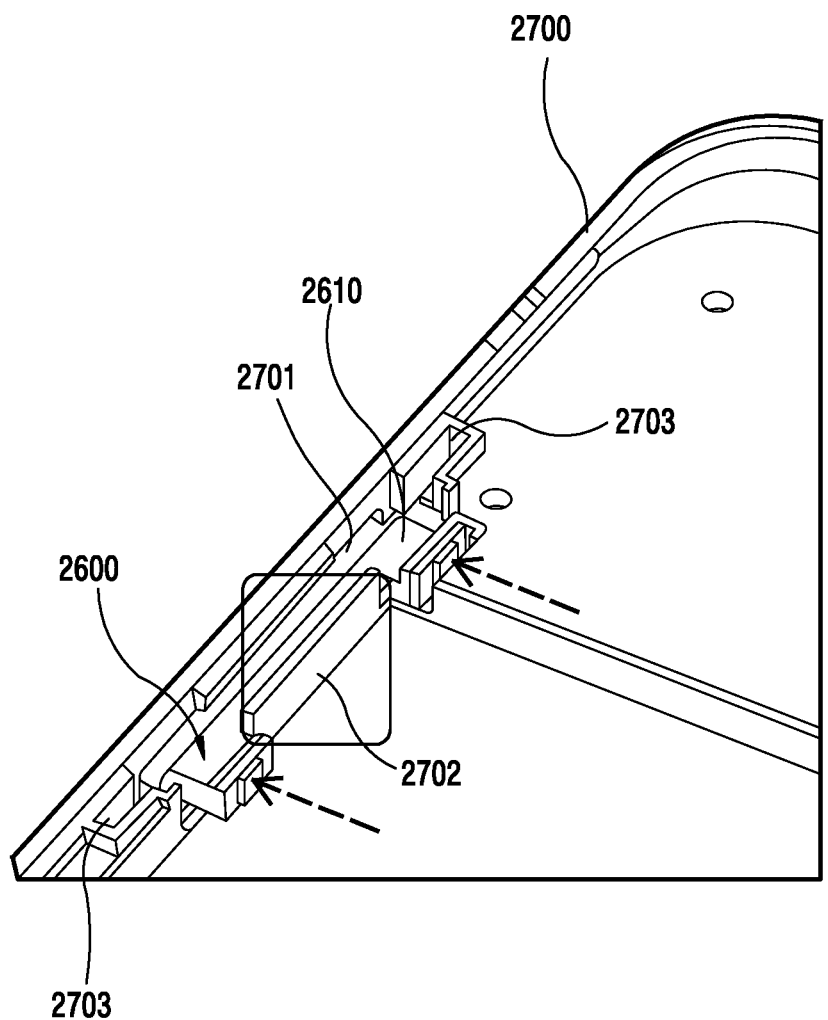

Referring to FIGS. 14A and 14B, the housing 2700 (e.g., a rear housing) of an electronic device may be formed with a key top passage hole 2701. According to one embodiment, the key top passage hole 2701 may be formed to have a size that allows the key top 2610 of the key button 2600 to pass through. According to one embodiment, the key top passage hole 2701 may be formed to have a size that allows only the key top 2610 to pass through and prevent the key tabs 2621 formed on the key base 2620 from passing through.

The key button 2600 may be lowered from the upper side of the housing 2700 in the direction indicated by the arrow, as illustrated in FIG. 14A, and then the key button 2600 may be moved forward toward the key top passage hole 2701, as illustrated in FIG. 14B. By this operation, the key button 2600 may be placed in an appropriate spot in the key top passage hole 2701 of the housing 2700 by the key tabs 2621, and at the same time, the key button 2600 may be disposed such that the key top 2610 is partially exposed to the outside of the housing 2700 through the key top passage hole 2701. According to one embodiment, the key button 2600 may have a "⊏"-shaped opened portion 2601 formed at the center thereof, and a key button accommodation piece 2702 may be formed in the housing 2700 to protrude upwardly so that it may fit in to the opened portion 2601. Accordingly, when the key button 2600 passes through the key top passage hole 2701 of the housing 2700, the key button accommodation piece 2702 is accommodated in the opened portion 2601 so that the key button 2600 can be easily assembled.

Figure 14C:
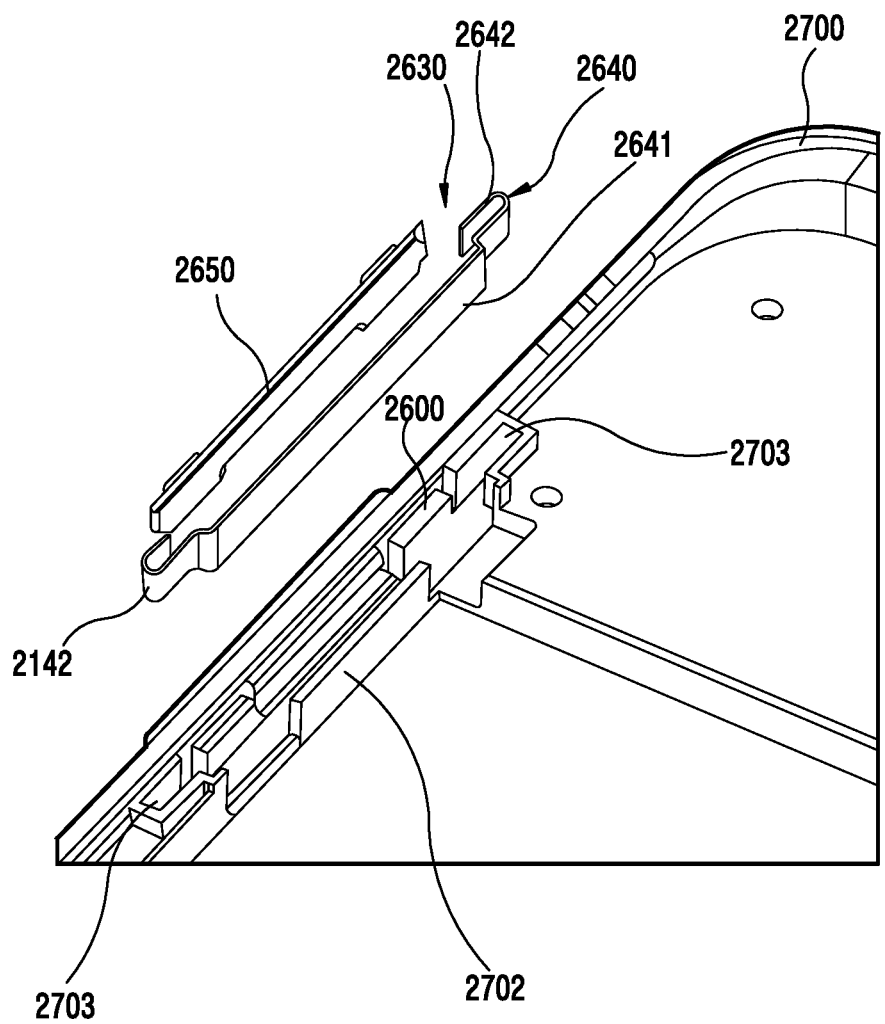
Figure 14D:
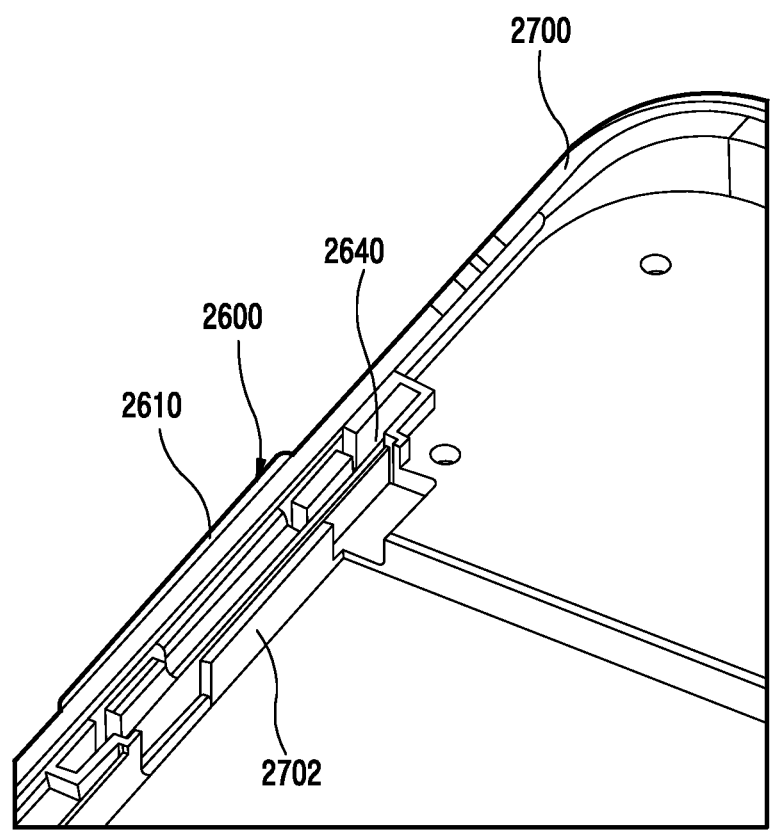

Referring to FIGS. 14C and 14D, the FPCB assembly 2630 can be mounted in the direction indicated by the arrow at the rear side while maintaining the state in which the key top 2610 of the key button 2600 has partially passed through the key top passage hole 2701 of the housing 2700. In such a case, the elastic pieces 2642, formed on the opposite ends of the plate body 2641 of the support plate 2640 of the FPCB assembly 2630, may be tightly seated in the elastic piece seating recess 2703 that is formed in the housing 2700. This is because the elastic pieces 2642 are seated in the elastic piece seating recesses 2703 while maintaining an outwardly biased elasticity providing tension to keep it in place.

According to various embodiments, because the pressing operation of the key top 2610 is implemented only by the support of the support plate 2640 of the FPCB assembly 2630 without any other separate instrument (e.g., a bracket) in the state where the key button 2600 is assembled in the inside of the housing 2700, the performance test of the key button 2600 can be easily implemented.

Figure 15:
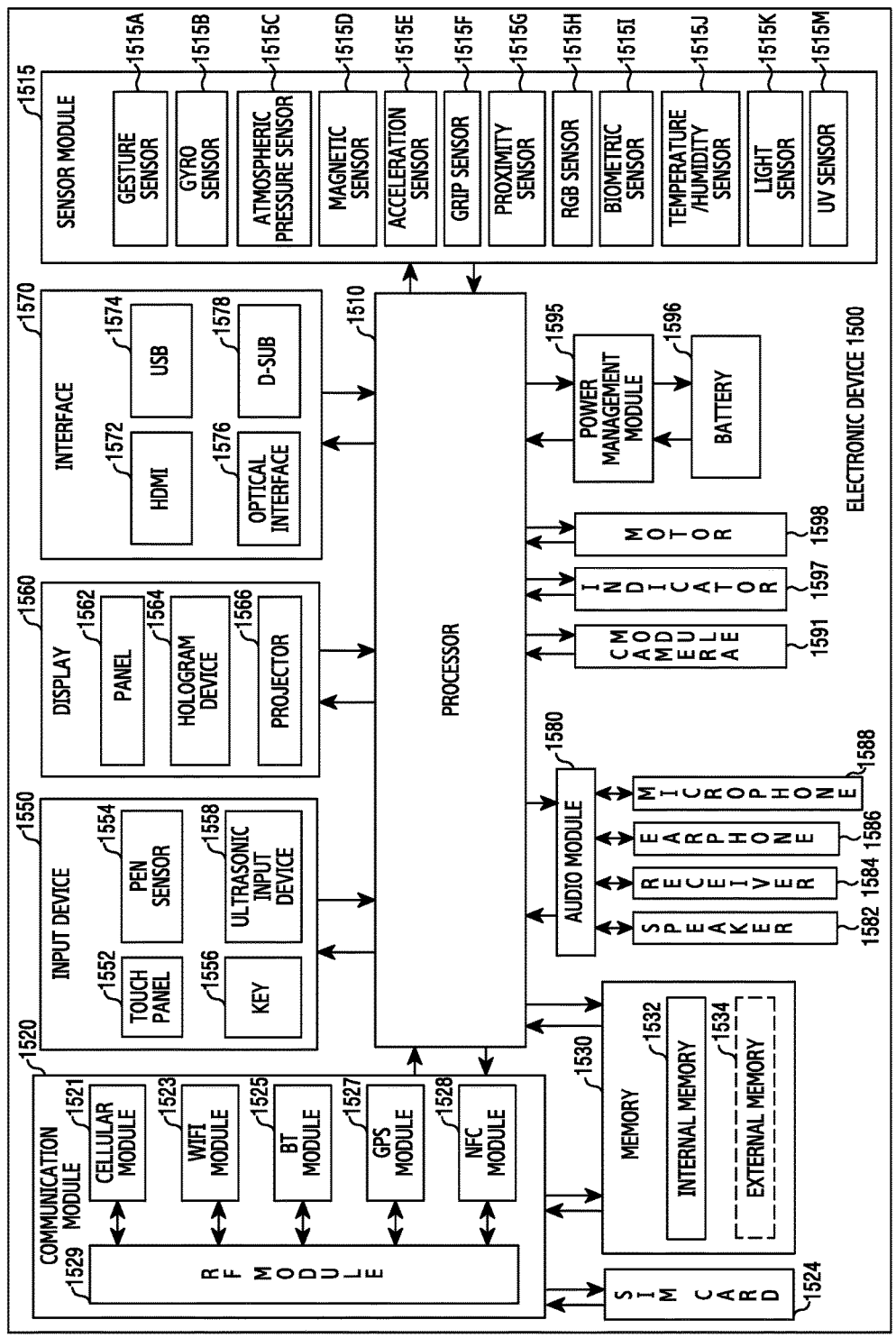
FIG. 15 illustrates a block diagram of an electronic device according to various embodiments of the present disclosure.

FIG. 15 is a block diagram illustrating an electronic device 1500 according to various embodiments of the present disclosure.

Referring to FIG. 15, the electronic device 1500 may form, for example, the whole or a part of the electronic device 101 illustrated in FIG. 1. The electronic device 1500 may include at least one of an Application Processor (AP) 1510, a communication module 1520, a subscriber identification module (SIM) 1524, memory 1530, a sensor module 1515, an input device 1550, a display 1560, an interface 1570, an audio module 1580, a camera module 1591, a power management module 1595, a battery 1596, an indicator 1597, and a motor 1598.

The AP 1510 may run, for example, an operating system or an application program to control a plurality of hardware or software components, and may also perform various data processing and arithmetic operations. The AP 1510 may be implemented by, for example, a System-on-Chip (SoC). According to one embodiment, the AP 1510 may further include a Graphic Processing Unit (GPU) and/or an image signal processor. The AP 1510 may include some components (e.g., the cellular module 1521) among the components illustrated in FIG. 15. The AP 1510 may load instructions and/or data from at least one of the other components to volatile memory that may be part of the internal memory 1532. The instructions and/or data may be received from, for example, non-volatile memory that may be part of the internal memory 1532. The AP 1510 may store various data in non-volatile memory in the internal memory 1532 and/or the external memory 1534.

The communication module 1520 may have a configuration that is the same as or similar to the communication interface 170 of FIG. 1. The communication module 1520 may include, for example, a cellular module 1521, a WiFi module 1523, a Bluetooth (BT) module 1525, a Global navigation Satellite System (GNSS) module 1527 (e.g., Global Positioning System (GPS) module, a Glonass module, a Beidou, or a Galileo module), a near Field Communication (NFC) module 1528, and a Radio Frequency (RF) module 1529.

The cellular module 1521 may provide, for example, a voice call, a video call, a message service, or an internet service through a communication network. According to one embodiment, the cellular module 1521 may perform discrimination and authentication of the electronic device 1500 within the communication network by using the SIM 1524. According to one embodiment, the cellular module 1521 may perform at least some of the multimedia control functions that may be provided by the AP 1510. According to one embodiment, the cellular module 1521 may include a Communication Processor (CP).

Each of the WiFi module 1523, the Bluetooth module 1525, the GNSS module 1527, and the NFC module 1528 may include, for example, a processor to process data transmitted/received therethrough. According to a certain embodiment, at least some (two or more) of the cellular module 1521, the WiFi module 1523, the Bluetooth module 1525, the GNSS module 1527, and the NFC module 1528 may be incorporated in a single Integrated Chip (IC) or an IC package.

The RF module 1529 may transmit/receive RF signals. The RF module 1529 may include, for example, a transceiver, a Power Amp Module (PAM), a frequency filter, a Low Noise Amplifier (LNA), and an antenna. According to another embodiment, at least one of the cellular module 1521, the WiFi module 1523, the Bluetooth module 1525, the GNSS module 1527, and the NFC module 1528 may transmit/receive RF signals through a separate RF module. Accordingly, there may be a plurality of RF modules 1529.

The SIM 1524 may include, for example, a card including a subscriber identification module and/or an embedded SIM, and may also include intrinsic identification information (e.g., Integrated Circuit Card IDentifier (ICCID)) or subscriber information (e.g., International Mobile Subscriber Identity (IMSI)).

The memory 1530 (e.g., the memory 130) may include, for example, an internal memory 1532 and/or an external memory 1534. The internal memory 1532 may include at least one of, for example, a volatile memory (e.g., Dynamic Random Access Memory (DRAM), Static RAM (SRAM), or Synchronous DRAM (SDRAM)), a nonvolatile memory (e.g., Read Only Memory (ROM), One Time Programmable ROM (OTPROM), Programmable ROM (PROM), Erasable and Programmable ROM (EPROM), Electrically Erasable and Programmable ROM (EEPROM), masked ROM, flash ROM, flash memory (e.g., NAND flash memory, or NOR flash memory), hard drive, or Solid State Drive (SSD)).

The external memory 1534 may further include a flash drive, e.g., Compact Flash (CF), Secure Digital (SD), Micro Secure Digital (Micro-SD), Mini Secure Digital (Mini-SD), extreme Digital (xD), Multi-Media Card (MMC), or memory stick. The external memory 1534 may be functionally and/or physically connected to the electronic device 1500 through various interfaces.

The sensor module 1515 may measure a physical quantity or sense an operating status of the electronic device 1500, and then convert the measured or sensed information into electric signals. The sensor module 1515 may include at least one of, for example, a gesture sensor 1515A, a gyro sensor 1515B, an atmospheric pressure sensor 1515C, a magnetic sensor 1515D, an acceleration sensor 1515E, a grip sensor 1515F, a proximity sensor 1515G, a color sensor 1515H (e.g., Red, Green, Blue (RGB) sensor), a biometric sensor 1515I, a temperature/humidity sensor 1515J, an illuminance sensor 1515K, and a Ultra-Violet (UV) sensor 1515M. Additionally or alternatively, the sensor module 1515 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor (not illustrated), an iris sensor (not illustrated), or a fingerprint sensor (not illustrated). The sensor module 1515 may further include a control circuit for controlling one or more sensors incorporated therein. In a certain embodiment, the electronic device 1500 may further include a processor configured to control the sensor module 1515 as a part of the AP 1510 or separate from the AP 1510 so as to control the sensor module while the AP 1510 is in the sleep state.

The input device 1550 may include a touch panel 1552, a (digital) pen sensor 1554, a key 1556, and an ultrasonic input device 1558. The touch panel 1552 may use at least one of, for example, a capacitive type touch panel, a resistive type touch panel, an infrared type touch panel, and an ultrasonic type panel. Also, the touch panel 1552 may further include a control circuit. In addition, the touch panel 1552 may further include a tactile layer so as to provide a tactile feedback to a user.

The (digital) pen sensor 1554 may be, for example, a part of the touch panel or may include a separate recognition sheet. The key 1556 may include, for example, a physical button, an optical key, or a keypad. The ultrasonic input device 1558 may sense through a microphone (e.g., a microphone 1588) ultrasonic waves that are generated by an input tool so that data corresponding to the sensed ultrasonic waves can be confirmed.

The display 1560 (e.g., the display 160) may include a panel 1562, a hologram device 1564, and a projector 1566. The panel 1562 may include a configuration that is the same as or similar to that of the display 160 of FIG. 1. The panel 1562 may be implemented to be flexible, transparent, or wearable. The panel 1562 may be configured as a single module with the touch panel 1552. The hologram device 1564 may show a stereoscopic image in the air using interference of light. The projector 1566 may project light onto a screen so as to display an image. The screen may be located inside or outside the electronic device 1500. According to one embodiment, the display 1560 may further include a control circuit to control the panel 1562, the hologram device 1564, or the projector 1566.

The interface 1570 may include, for example, a High-Definition Multimedia Interface (HDMI) 1572, a Universal Serial Bus (USB) interface, an optical interface 1576, or a D-subminiature (D-sub) interface 1578. For example, the interface 1570 may be included in the communication interface 170 illustrated in FIG. 1. Additionally or alternatively, the interface 1570 may include, for example, a Mobile High-definition Link (MHL) interface, a Secure Digital card/Multi-Media Card (SD/MMC) interface, or an Infrared Data Association (IrDA) standard interface.

The audio module 1580 may convert, for example, sounds to electric signals and vice versa. At least some of the components of the audio module 1580 may be included, for example, in the input/output interface 150 illustrated in FIG. 1. The audio module 1580 may process sound information input or output through, for example, a speaker 1582, a receiver 1584, an earphone 1586, or a microphone 1588.

The camera module 1591 is a device capable of photographing, for example, a still image and a moving image. According to one embodiment, the camera module 1591 may include at least one image sensor (e.g., a front sensor or a rear sensor), a lens, an Image Signal Processor (ISP), or a flash (e.g., LED or xenon lamp).

The power management module 1595 may manage, for example, the electric power of the electronic device 1500. According to one embodiment, the power management module 1595 may include a Power Management Integrated Circuit (PMIC), a charger Integrated Circuit (IC), and/or a battery or fuel gauge. The PMIC may be wired and/or wireless charge type. The wireless charge type may include, for example, a magnetic resonance type, a magnetic induction type, or an electromagnetic wave type, and may further include an additional circuit for wireless charge, such as a coil loop, a resonance circuit, or a rectifier. The battery gauge may measure amount of power remaining in the battery 1596 and a voltage, current, and/or temperature during charging the battery 1596. The battery 1596 may store electric power and supply the electric power to the electronic device 1500. The battery 1596 may be, for example, a rechargeable battery and/or a solar battery.

The indicator 1597 may indicate a specific status of the electronic device 1500 or of a part thereof, such as a booting status, a message status, or battery charge status. The motor 1598 may generate vibration or a haptic effect. Although not illustrated, the electronic device 1500 may include a processor (e.g., GPU) to support a mobile TV. The processor to support a mobile TV may process media data that complies with, for example, Digital Multimedia Broadcasting (DMB), Digital Video Broadcasting (DVB), and/or mediaFlo™.

Various embodiments of the disclosure may provide for an electronic device comprising: a housing part (e.g. housing 2000) with a key top passage hole (e.g. key top passage hole 2010); and a key button assembly (e.g. key button 1800) comprising a key top (e.g. key top 1810) and a key base (e.g. key base 1820), wherein the key button assembly is configured to be inserted through the key top passage hole such that a portion of the key top is exposed outside the housing part while keeping the key base within the housing part; and a plate assembly (e.g. support plate 1840) configured to secure the key button assembly in the housing portion to prevent the key button assembly from moving out of place, wherein the plate assembly is placed behind the key button assembly.

The electronic device may further comprise a detector assembly (e.g. FPCB 1850) placed between the plate assembly and the key button assembly, wherein the detector assembly is configured to detect inward movement of the key top toward the key base with respect to the key base. The detector assembly may also be configured to communicate the inward movement of the key top to a processor (e.g. 120).

In some embodiments, the plate assembly may comprise the detector assembly. The plate assembly may also comprise flexible end portions (e.g. elastic pieces 1842) at each end of the plate assembly. The end portions may be, for example, in a substantially U-shape. Accordingly, the housing part may comprise seating recesses (e.g. elastic piece seating recess 2011) corresponding to the flexible end portions to accept the flexible end portions. The plate assembly may also comprise at least one tab (e.g. plate support piece 2313) in the housing part to provide support against flexing by the plate assembly.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

What is claimed is:

1. An electronic device comprising:
   a front cover that forms a front surface of the electronic device;
   a rear cover that forms a rear surface of the electronic device;
   a bezel that surrounds a space formed by the front cover and the rear cover, and includes a first portion that includes an opening;
   a plate that includes a planar surface that is parallel with the front cover within the space, and includes a first protrusion and a second protrusion that are disposed close to the opening and are spaced apart from each other, wherein the first protrusion and the second protrusion are disposed to provide a passage that leads to the opening;
   a key that has a size and a shape that enable the key to pass through the passage and the opening, and is inserted into the passage and the opening to be movable in a first direction;
   a first member that is attached to or integrally formed with a surface of the key opposite to the surface of the key, which is exposed outside the electronic device, so as to prevent the key from moving farther through the opening; and
   a second member including, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the second protrusion, wherein the first member is inserted into a gap between the key and the central portion.

2. The electronic device of claim 1, wherein the first protrusion and the second protrusion do not contact the first portion.

3. The electronic device of claim 1, wherein, at least one of the first elastic end portion and the second elastic end portion has a substantially U-shape.

4. The electronic device of claim 1, further comprising an electric component inserted into a gap between the first member and the central portion and configured to sense a movement of the key.

5. The electronic device of claim 1, wherein the plate is integral with the bezel.

6. The electronic device of claim 1, wherein the rear cover also forms a side surface of the electronic device.

7. The electronic device of claim 6, wherein the rear cover and the side surface are made of same material.

8. The electronic device of claim 6, wherein the rear cover and the side surface are made of metal.

9. An electronic device comprising:
   a front cover that forms a front surface of the electronic device;
   a rear cover that forms a rear surface of the electronic device;
   a bezel that surrounds a space formed by the front cover and the rear cover, and includes a first portion that includes a first opening and a second opening;
   a plate that includes a planar surface that is parallel with the front cover within the space, and includes a first protrusion, a second protrusion, and a third protrusion, which are disposed close to the opening and are spaced apart from each other, the second protrusion being interposed between the first protrusion and the third protrusion,
   wherein the first protrusion and the second protrusion are disposed to provide a first passage that leads to the first opening without being in contact with the first portion,
   wherein the second protrusion and the third protrusion are disposed to provide a second passage that leads to the second opening without being in contact with the first portion;
   a first key that has a size and a shape that enables the first key to pass through the first passage and the first opening, and is inserted into the first passage and the first opening to be movable in a first direction;
   a second key that has a size and a shape that enables the second key to pass through the second passage and the second opening, and is inserted into the second passage and the second opening to be movable in the first direction;
   a first key member that is attached to or integrally formed with a surface of the first key opposite to the surface of the first key, which is exposed outside the electronic device, so as to the first key in the opening;
   a second key member that is attached to or integrally formed with a surface of the second key opposite to the surface of the second key, which is exposed outside the electronic device, so as to prevent the second key in the opening; and
   a first member that includes, within the space, a central portion that extends in a second direction perpendicular to the first direction, a first elastic end portion that extends from one end of the central portion and is disposed between the first portion and the first protrusion, and a second elastic end portion that extends from the other end of the central portion, and is disposed between the first portion and the third protrusion,
   wherein the first key member is inserted into a gap between the first key and the central portion, and
   wherein the second key member is inserted into a gap between the second key and the central portion.

10. A method of manufacturing an electronic device, the method comprising:
    connecting a bezel that surrounds an inner mounting space of the electronic device and a plate, wherein the bezel includes a first portion that includes an opening formed through a portion of the bezel, the plate includes a planar surface that is parallel with the front cover within the inner mounting space, and includes a first protrusion and a second protrusion that are disposed close to the opening and are spaced apart from each other, the first protrusion and the second protrusion being configured to form a passage that leads to the opening without being in contact with the first portion;

inserting a key through the passage and the opening such that at least a part of the key is exposed outside the electronic device, wherein the key is prevented from going completely through the opening by using a first member that is attached to or integrally formed with a surface of the key opposite to the surface of the key, which is exposed outside of the electronic device, and includes one end portion that extends in a first direction parallel to the longitudinal direction of the first portion, and the other end portion that extends in the first direction and is formed at the opposite side to the one end portion so as to prevent the key from being pulled out to the outside; and inserting a second member including, within the inner mounting space, a central portion that extends in the first direction, a first end portion that extends in the first direction and is disposed between the first portion and the first protrusion, and a second end portion that extends in the first direction and is disposed between the first portion and the second protrusion.

11. The method of claim 10, further comprising providing a rear cover that forms a rear surface of the electronic device.

12. The method of claim 10, further comprising providing a front cover that forms a front surface of the electronic device.

* * * * *